US012488539B2

(12) United States Patent
Barley

(10) Patent No.: US 12,488,539 B2
(45) Date of Patent: Dec. 2, 2025

(54) COMPUTER AIDED AUTOMATED SHAPE GENERATION OF THREE-DIMENSIONAL GEOMETRIES

(71) Applicant: Autodesk, Inc., San Francisco, CA (US)

(72) Inventor: Stephen Alan Barley, Cambridge (GB)

(73) Assignee: Autodesk, Inc., San Francisco, CA (US)

( * ) Notice: Subject to any disclaimer, the term of this patent is extended or adjusted under 35 U.S.C. 154(b) by 233 days.

(21) Appl. No.: 18/341,625

(22) Filed: Jun. 26, 2023

(65) Prior Publication Data
US 2024/0428520 A1    Dec. 26, 2024

(51) Int. Cl.
*G06T 17/30* (2006.01)
*G06T 17/20* (2006.01)

(52) U.S. Cl.
CPC ............ *G06T 17/205* (2013.01); *G06T 17/30* (2013.01); *G06T 2200/24* (2013.01); *G06T 2210/36* (2013.01)

(58) Field of Classification Search
CPC ... G06T 17/205; G06T 17/30; G06T 2200/24; G06T 2210/36; G06T 2219/2021; G06T 19/20; G06F 30/20
See application file for complete search history.

(56) References Cited

U.S. PATENT DOCUMENTS

2002/0030677 A1 * 3/2002 Huang .................... G06T 17/20
345/423
2003/0112239 A1 * 6/2003 Shin ........................ G06T 17/20
345/428

(Continued)

FOREIGN PATENT DOCUMENTS

EP    3293648 A1 *   3/2018 ............. G06F 30/00

OTHER PUBLICATIONS

Amroune, A., Cuillière, J. C., & François, V. (2022). Automated lofting-based reconstruction of CAD models from 3D topology optimization results. Computer-Aided Design, 145, 103183. (Year: 2022).*

(Continued)

*Primary Examiner* — Daniel F Hajnik
*Assistant Examiner* — Adeel Bashir
(74) *Attorney, Agent, or Firm* — Fish & Richardson P.C.

(57) ABSTRACT

Methods, systems, and apparatus, including medium-encoded computer program products, including: receiving, by a shape modeling computer program, a selection of first geometry defined in a data structure used by the computer program to represent a three-dimensional model of an object and an indication of an amount of complexity reduction, The computer program produces a second geometry defined in the data structure based on the indication of the amount of indicated complexity reduction and taking into account local shape curvature for the first geometry, where the second geometry replaces the first geometry in representing the three-dimensional model of the object. The computer program provides the three-dimensional model of the object, with the second geometry included in the three-dimensional model, for use in manufacturing a physical structure corresponding to the object using one or more computer-controlled manufacturing systems, or for use in displaying the object on a display screen.

51 Claims, 16 Drawing Sheets

(56) References Cited

U.S. PATENT DOCUMENTS

| | | | |
|---|---|---|---|
| 2009/0174711 A1* | 7/2009 | Lee | G06T 17/20 345/420 |
| 2018/0276887 A1* | 9/2018 | Younas | G06T 7/12 |

OTHER PUBLICATIONS

Lee, T. C., Kashyap, R. L., & Chu, C. N. (1994). Building skeleton models via 3-D medial surface axis thinning algorithms. CVGIP : graphical models and image processing, 56(6), 462-478. (Year: 1994).*

Denk, M., Rother, K., & Paetzold, K. (2021). Subdivision Surface mid-surface reconstruction of topology optimization results and thin-walled shapes using surface skeletons. Proceedings of the Design Society, 1, 2771-2780. (Year: 2021).*

Asgharian, L., & Ebrahimnezhad, H. (2023). 3D model representation using space curves: an efficient mesh simplification method by exchanging triangulated mesh to space curves. Multimedia Tools and Applications, 82(20), 30965-31000. (Year: 2023).*

NPL Video Titled "Scaniverse: Mesh simplification", available for viewing at: www.youtube.com/watch?v=iyi5djr5Xck; published Jun. 24, 2021; screenshot included. (Year: 2021).*

Autodesk.com [online], "Create a T-Spline pipe," available on or before Mar. 20, 2023, retrieved on Jun. 20, 2023, retrieved from URL <https://help.autodesk.com/view/fusion360/ENU/?guid=GUID-2F3749DC-8EB9-4A16-93D3-A04976CE13A7>, 2 pages [Video Submission].

Autodesk.com [online], "Loft reference (Surface)," retrieved on Jun. 20, 2023, available on or before Jan. 20, 2022, retrieved on Jun. 20, 2023, retrieved from URL <https://help.autodesk.com/view/fusion360/ENU/?guid=SFC-REF-LOFT-DLG>, 4 pages.

CGAL.org [online], "CGAL 5.5.2—Triangulated Surface Mesh Skeletonization," Feb. 24, 2023, retrieved on Jun. 20, 2023, retrieved from URL <https://doc.cgal.org/latest/Surface_mesh_skeletonization/index.html>, 6 pages.

Lee et al., "Building Skeleton Models via 3-D Medial Surface/Axis Thinning Algorithms," CVGIP: Graphical Models and Image Processing, Nov. 1994, 56(6):462-478.

Ma et al., "A Fully Parallel 3D Thinning Algorithm and Its Applications," Comput. Vis. Image Underst., Nov. 1996, 64(3):420-433.

She et al., "Improved 3D Thinning Algorithms for Skeleton Extraction," 2009 Digital Image Computing: Techniques and Applications, Melbourne, Australia, Dec. 1-3, 2009; pp. 14-18.

Tagliasacchi et al., "Mean curvature skeletons," Computer Graphics Forum, Aug. 2012, 31(5):1735-1744.

The NURBS Book, Piegl and Tiller (eds.), Dec. 2012, Chapter 10, p. 488.

Du et al., "InverseCSG: Automatic Conversion of 3D Models to CSG Trees," ACM Transactions on Graphics, Nov. 2018, 37(6):213, 16 pages.

* cited by examiner

COMPUTER AIDED AUTOMATED SHAPE GENERATION OF THREE-DIMENSIONAL GEOMETRIES

BACKGROUND

This specification relates to computer aided design of physical structures, which can be manufactured using additive manufacturing, subtractive manufacturing and/or other manufacturing systems and techniques, or other structures, and which can be provided as a digital asset, such as for use in animation.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modeled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold) and molding.

SUMMARY

This specification describes technologies relating to computer aided design of structures by shape synthesis, e.g., automated design of physical structures. The systems and techniques described can be used with computer aided design of three-dimensional (3D) geometry when an initially synthesized shape is too complex for a desired application, such as for downstream operations to be performed on the generated geometry, e.g., to prepare for manufacturing of the structure, and at least some of that shape complexity is to be removed before further use of the 3D geometry. Also, the systems and techniques described are applicable in other technical fields of endeavor, including generation of conceptual work or digital-only assets, such as for use in animation. In general, the described systems and techniques for reducing the complexity of an automatically generated 3D geometry can facilitate further use of the 3D geometry by maintaining shape continuity, e.g., maintaining, C0, C1 and C2 continuity while making the 3D geometry more readily editable by the user.

In general, one or more aspects of the subject matter described in this specification can be embodied in one or more methods (and also one or more non-transitory computer-readable mediums tangibly encoding a computer program operable to cause data processing apparatus to perform operations), including: receiving, by a shape modeling computer program, a selection of first geometry defined in a data structure used by the shape modeling computer program to represent a three-dimensional model of an object and an indication of an amount of complexity reduction, The shape modeling computer program produces a second geometry defined in the data structure based on the indication of the amount of indicated complexity reduction and taking into account local shape curvature for the first geometry, where the second geometry replaces the first geometry in representing the three-dimensional model of the object. The shape modeling computer program provides the three-dimensional model of the object, with the second geometry included in the three-dimensional model, for use in manufacturing a physical structure corresponding to the object using one or more computer-controlled manufacturing systems, or for use in displaying the object on a display screen.

The foregoing and other embodiments can each optionally include one or more of the following features, alone or in combination. In particular, one embodiment includes all the following features in combination. In some implementations, the first geometry is defined in the data structure using a polygon mesh or the polygon mesh is generated from the first geometry, where the producing includes skeletonizing, by the computer program, the polygon mesh to produce a network of connected polylines. The computer program generates medial sections from the polygon mesh and the connected polylines, each of the medial sections corresponding to a cross-section of the polygon mesh captured orthogonal to the network of connected polylines and including curvature information for the polygon mesh at the cross-section. A number of the medial sections generated is based on the indication of the amount of desired complexity reduction. The computer program generates a control mesh for a smooth surface representation of the second geometry from the medial sections and the network of connected polylines representing the polygon mesh representing the first geometry.

In some implementations, generating a medial section of the medial sections includes, for each polyline of the network of connected polylines, constructing, by the computer program, a plane through a point on the polyline with a normal tangent to the polyline. The computer program captures the cross-section of the polygon mesh at the point by intersecting the plane with the polygon mesh and determines a minimum distance and a maximum distance between a perimeter of the cross-section and the point on the polyline. The computer program generates the medial section based on the minimum distance and the maximum distance between the cross-section and the point on the polyline.

In some implementations, generating the medial section based on the minimum distance and the maximum distance between the cross-section and the point on the polyline includes determining, by the computer program, an average distance between the perimeter of the cross-section and the point on the polyline, and generating the medial section having a radius corresponding to the average distance.

In some implementations, the computer program further determines the number of the medial sections generated based on the indication of the amount of desired complexity reduction by generating a first number of points corresponding to first locations of endpoints of polylines of the network of connected polylines. The computer program generates a second number of points corresponding to second locations of intersections between at least two polylines of the network of connected polylines, and generates a third number of points corresponding to third locations of midpoints along respective polylines of the network of connected polylines. Generating the third number of points corresponding to third location of midpoints along respective polylines of the network of connected polylines can include calculating, from the indicated amount of complexity reduction, an arc length, and generating each point of the third number of points corresponding to lengths along polylines between points including the first number of points and the second number of points of at least the arc length.

In some implementations, the computer program further receives an updated indication of a complexity reduction amount. The computer program calculates an updated arc length based on the updated indication of complexity reduction amount, and adjusts at least one point of the third number of points in response to the updated arc length.

In some implementations, computer program further presents, in a user interface, the network of connected polylines and medial sections. The computer program indicates, in the user interface, regions of one or more medial sections distributed about the network of connected polylines, where a number of medial sections can be adjusted to update a complexity of the control mesh for the smooth surface representation of the second geometry, and receives, through the user interface, a selection of at least one region of the regions of one or more medial sections to update the complexity of the control mesh.

In some implementations, the first geometry is defined in the data structure using a polygon mesh or the polygon mesh is generated from the first geometry, and the producing, by a computer program, includes skeletonizing the polygon mesh to produce a network of connected polylines representing the first geometry. The computer program obtains the indication of the amount of desired complexity reduction as one or more construction parameters for the second geometry, the one or more construction parameters including an arc length, and generates a node network based on the network of connected polylines, the node network including (i) first nodes corresponding to intersections of the connected polylines and second nodes added by subdividing the connected polylines based on the arc length, and (ii) beams connecting the first and second nodes. The computer program generates a control mesh for a smooth surface representation of the second geometry from spline curves produced for the beams.

In some implementations, the computer program further adjust a number of nodes of the first nodes and the second nodes, where the adjusting includes determining a distance tolerance based on an average beam length for the beams connecting neighboring nodes of the first nodes and the second nodes of the node network, and removing at least one node of the number of nodes based on the distance tolerance. Generating the control mesh from spline curves produced for the beams can include, for each beam of the beams of the node network, generating, for each end node of the first nodes and the second nodes of the beam, an end cross-section, where a shape of the end cross-section and a scaling factor for a cross-sectional area of the end cross-section are based on the one or more construction parameters, and constructing a centerline loft body from the spline curve and the end cross-section.

In some implementations, the spline curves are B-spline curves, and generating the control mesh from spline curves produced for the beams further includes converting, by the computer program, the B-spline curves into T-spline curves. The computer program determines, based on the shape and the scaling factor of each of the end cross-sections, a respective radius for a pipe handle corresponding to the end cross-section, affixes, to each end cross-section, the pipe handle, and generates the control mesh from the T-spline curves and pipe handles.

In some implementations, the computer program further presents, in a user interface, dynamic controls for adjusting the one or more construction parameters. The computer program receives, through the user interface, an indication of an update to at least one of the one or more construction parameters, produces, an updated second geometry defined in the data structure based on the indication of the update to at least one of the one or more construction parameters, and presents, in the user interface, the updated second geometry.

In some implementations, generating, by the computer program, the control mesh for the smooth surface representation of the second geometry from spline curves produced for the beams includes determining, based on the indication of the amount of desired complexity reduction as the one or more construction parameters for the second geometry, to generate the control mesh as a B-Spline surface construction or as a T-Spline surface construction.

In some implementations, the first geometry is defined in the data structure using a polygon mesh, and the polygon mesh is output from an automatic 3D geometry generation algorithm.

In some implementations, the computer program further provides, in a user interface, candidate regions of multiple regions on which to apply the amount of complexity reduction of the first geometry representing the three-dimensional model of the object, and receives in the user interface, a selection of one or more of the candidate regions on which to apply the amount of complexity reduction to produce the second geometry.

In some implementations, producing, by the computer program, the second geometry defined in the data structure includes ranking two or more automated shape reconstruction methods based in part on (A) the amount of complexity reduction, (B) characteristics of the first geometry representing the three-dimensional model of the object, or (C) a combination thereof, and presenting, in a user interface and for selection by a user, a ranked list of the two or more automated shape reconstruction methods for producing the second geometry.

Particular embodiments of the subject matter described in this specification can be implemented to realize one or more of the following advantages. The automated shape generation system can generate a control mesh of a smooth surface representation of an object from an input mesh that captures an original topology of the input mesh but with simplified geometry. A complexity of the generated output control mesh from the automated shape generation system is reduced compared to an output mesh of a smooth surface representation of the object generated from a direct conversion of the input mesh, e.g., the generated output control mesh can include about 10-15% of a total number of faces when compared to the output control mesh generated by a direct conversion method. The resulting simplified output model can be significantly more editable in downstream operations, e.g., for adding blends between organic regions and preserves and/or in simulation, as well as have improved ease of manufacture and reduced cost of manufacturing.

In some instances, a topology optimization process can be used to perform automatic generation of 3D geometry of an object in a design of a physical structure (e.g., "generative design"). In some cases, the topology optimization process takes place using a different representation of geometry than that employed by the CAD system. For example, a CAD system might use a boundary representation ("B-Rep") while the geometry generation and optimization engine might employ a boundary-based representation (e.g., a level set-based representation) or a density-based representation embedded in a voxel or tetrahedral mesh. In such cases, the automated shape generation system described herein can be used to convert a discrete boundary-based or density-based representation into a simplified control mesh of a smooth surface representation of the object.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
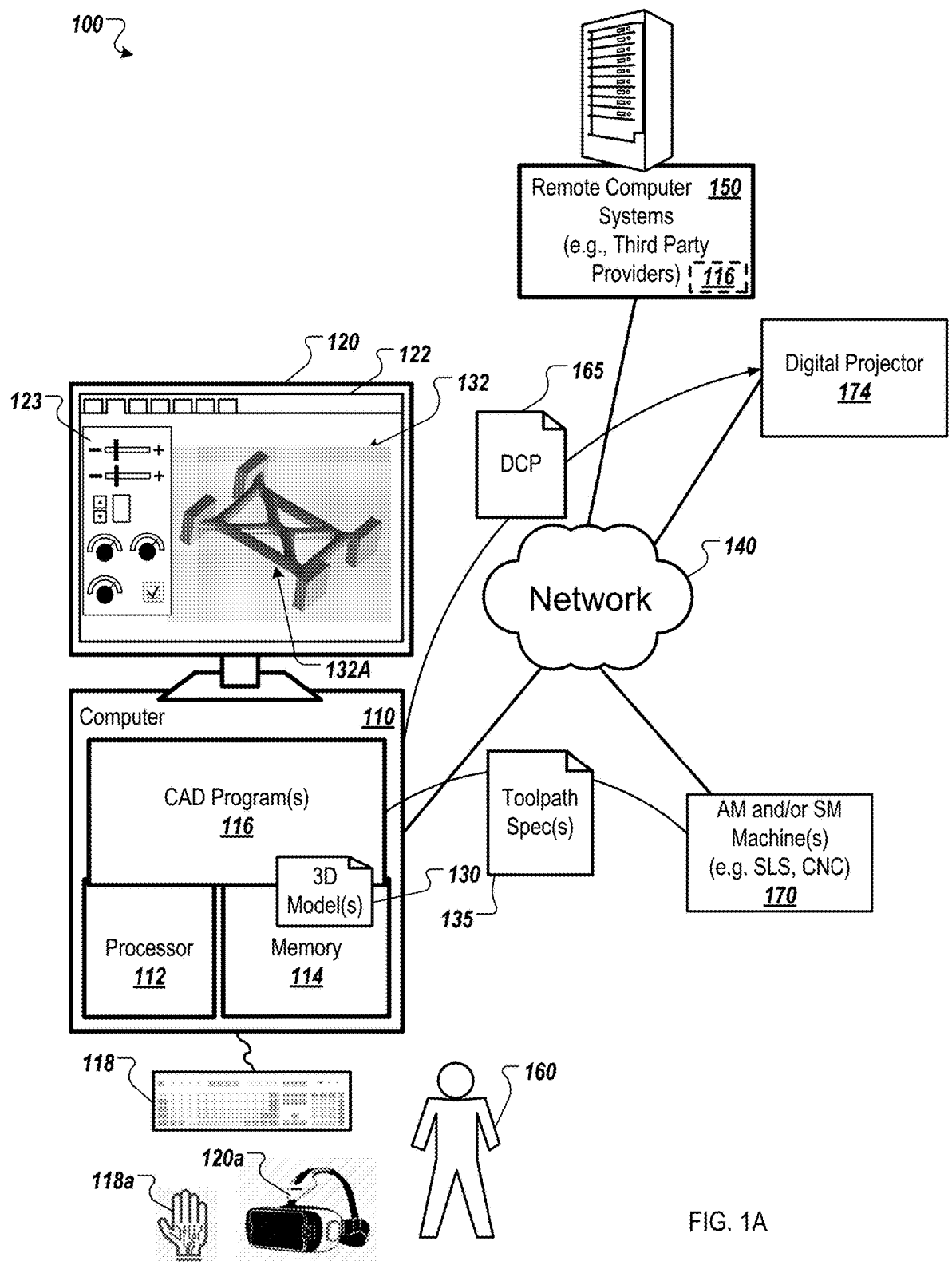
FIG. 1A shows an example of a system usable to facilitate computer aided design of structures with user control of shape complexity.

FIG. 1A shows an example of a system 100 usable to facilitate computer aided design of structures using automated shape reconstruction processes. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions, which can be implemented as part of one or more automated shape generation processes, e.g., shape synthesis and/or generative design processes, or as a post-processing operation performed on a shape that has been automatically generated, e.g., an automated shape reconstruction process, or as a user tool for reducing the complexity of 3D geometries generally.

In some instances, numerical simulation can be used simulate one or more physical properties and can use one or more types of simulation to produce a numerical assessment of physical response (e.g., structural response) of the modeled object. For example, finite element analysis (FEA), including linear static FEA, finite difference method(s), and material point method(s) can be used. Further, the simulation of physical properties can include Computational Fluid Dynamics (CFD), Acoustics/Noise Control, thermal conduction, computational injection molding, electric or electromagnetic flux, and/or material solidification (which is useful for phase changes in molding processes) simulations. Output of numerical simulation processes can be provided as input to the systems and processes described herein.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., shape generation, physical simulation operations, and/or shape reconstruction) "to the cloud" by having one or more programs 116 on one or more computers 150 perform the offloaded processing operations. In some implementations, all automated shape reconstruction operations are run by one or more programs in the cloud and not in a shape representation modeler (e.g., B-Rep modeler) that runs on the local computer. Moreover, in some implementations, the shape reconstruction program(s) can be run in the cloud from an Application Program Interface (API) that is called by a program, without user input through a graphical user interface.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, and 120 can include VR/AR input controllers, gloves, or other hand manipulating tools 118a, and/or a VR/AR headset 120a. In some instances, the input/output devices can include hand-tracking devices that are based on sensors that track movement and recreate interaction as if performed with a physical input device. In some implementations, VR and/or AR devices can be standalone devices that may not need to be connected to the computer 110. The VR and/or AR devices can be standalone devices that have processing capabilities and/or an integrated computer such as the computer 110, for example, with input/output hardware components such as controllers, sensors, detectors, etc.

In any case, a user 160 interacts with the CAD program(s) 116 to create and modify 3D model(s), which can be stored in model document(s) 130. In the example shown in FIG. 1A, a 3D model 132 includes geometry 132A that has been automatically reconstructed using a process that employs systems and techniques described in this document.

The automated shape reconstruction process can receive an initial 3D model as input, i.e., the starting shape. The 3D model of the object can be user-generated and/or automatically generated using shape synthesis and/or generative design systems and techniques.

In some implementations, the user 160 provides a 3D model generated using a generative design process. In some implementations, a generatively designed 3D shape of a modeled object has a level-set representation used during generative modelling of the object. The generatively designed 3D shape of the object can be varied using topology optimization to update the level-set representation in accordance with shape change velocities based on numerical simulation evaluation. A level-set representation method can be used to track the boundary of the shape of the modeled object during topology optimization, which has the advantages of providing precise knowledge of the boundary, and allowing topological changes as the surface evolves without the need for re-meshing. The shape synthesis and/or generative design processes can implement connectivity filtering to keep preserve bodies connected. In any case, note that the shape synthesis process can (and often will) be done using a different representation of geometry than that employed by the CAD program(s) 116 for 3D modelling. For example, the CAD program(s) 116 can use a B-Rep model for the input geometry, while the geometry generation engine (e.g., in CAD program(s) 116) can employ a level-set function embedded in a voxel or tetrahedral mesh.

In some implementations, the initial 3D model is represented in a polygon mesh. For example, the starting shape is a polygon mesh output from an automated shape generation system, e.g., generative design (GD) solver, or a polygon mesh generated from a smooth surface representation of a 3D model of an object. A polygon mesh can be a 3D model representation of an object having organic qualities and a first number of mesh points. In addition to the initial 3D model represented in a polygon mesh, a desired complexity reduction can be indicated (e.g., input by a user or automatically generated by the computer program) and can be used to generate a simplified model from the initial 3D model.

In any case, the initial 3D model and/or user selected portions thereof and a desired complexity reduction (e.g., input by a user or automatically selected) can be processed by the CAD program(s) 116 using the systems and techniques described in this specification to reduce the complexity of the 3D geometry, e.g., to produce geometry 132A, while maintaining the basic character of the initial 3D model. Once the user 160 is satisfied with the reduced complexity model 132, the computer model 132 can be stored as a model document 130 and/or used to generate another representation of the model (e.g., toolpath specifications for a manufacturing process). This can be done upon request by the user 160, or in light of the user's request for another action, such as sending the computer model 132 to a manufacturing machine, e.g., additive manufacturing (AM) machine(s) and/or subtractive manufacturing (SM) machine(s) 170, or other manufacturing machinery, which can be directly connected to the computer 110, or connected via a network 140, as shown. This can involve a post-process carried out on the local computer 110 or externally, for example, based on invoking a cloud service running in the cloud, to further process the generated 3D model (e.g., based on considerations associated with the additive manufacturing process) and to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In addition, the user 160 can save or transmit the 3D model for later use. For example, the CAD program(s) 116 can store the document 130 that includes the algorithmically designed model 132.

The CAD program(s) 116 can provide a document 135 (having toolpath specifications of an appropriate format) to an AM and/or SM machine 170 to produce a physical structure corresponding to at least a portion of the algorithmically designed model 132. An AM machine 170 can employ one or more additive manufacturing techniques, such as granular techniques (e.g., Powder Bed Fusion (PBF), Selective Laser Sintering (SLS) and Direct Metal Laser Sintering (DMLS)) or extrusion techniques (e.g., Fused Filament Fabrication (FFF), metals deposition). In some cases, the AM machine 170 builds the physical structure directly, and in some cases, the AM machine 170 builds a mold for use in casting or forging the physical structure.

An SM machine 170 can be a Computer Numerical Control (CNC) milling machine, such as a multi-axis, multi-tool milling machine used in the manufacturing process. For example, the CAD program(s) 116 can generate CNC instructions for a machine tool system 170 that includes multiple tools (e.g., solid carbide round tools of different sizes and shapes, and insert tools of different sizes that receive metal inserts to create different cutting surfaces) useable for various machining operations. Thus, in some implementations, the CAD program(s) 116 can provide a corresponding document 135 (having toolpath specifications of an appropriate format, e.g., a CNC numerical control (NC) program) to the SM machine 170 for use in manufacturing the physical structure using various cutting tools, etc.

In addition, in some implementation, no physical manufacturing is involved. The systems and techniques described herein are applicable to any suitable 3D modelling software. Thus, in some implementations, the CAD program(s) 116 can be animation production program(s) that render the 3D model 132 to a document 165 of an appropriate format for visual display, such as by a digital projector 174 (e.g., a digital cinema package (DCP) 165 for movie distribution) or other high resolution display device. Other applications are also possible.

Figure 1B:
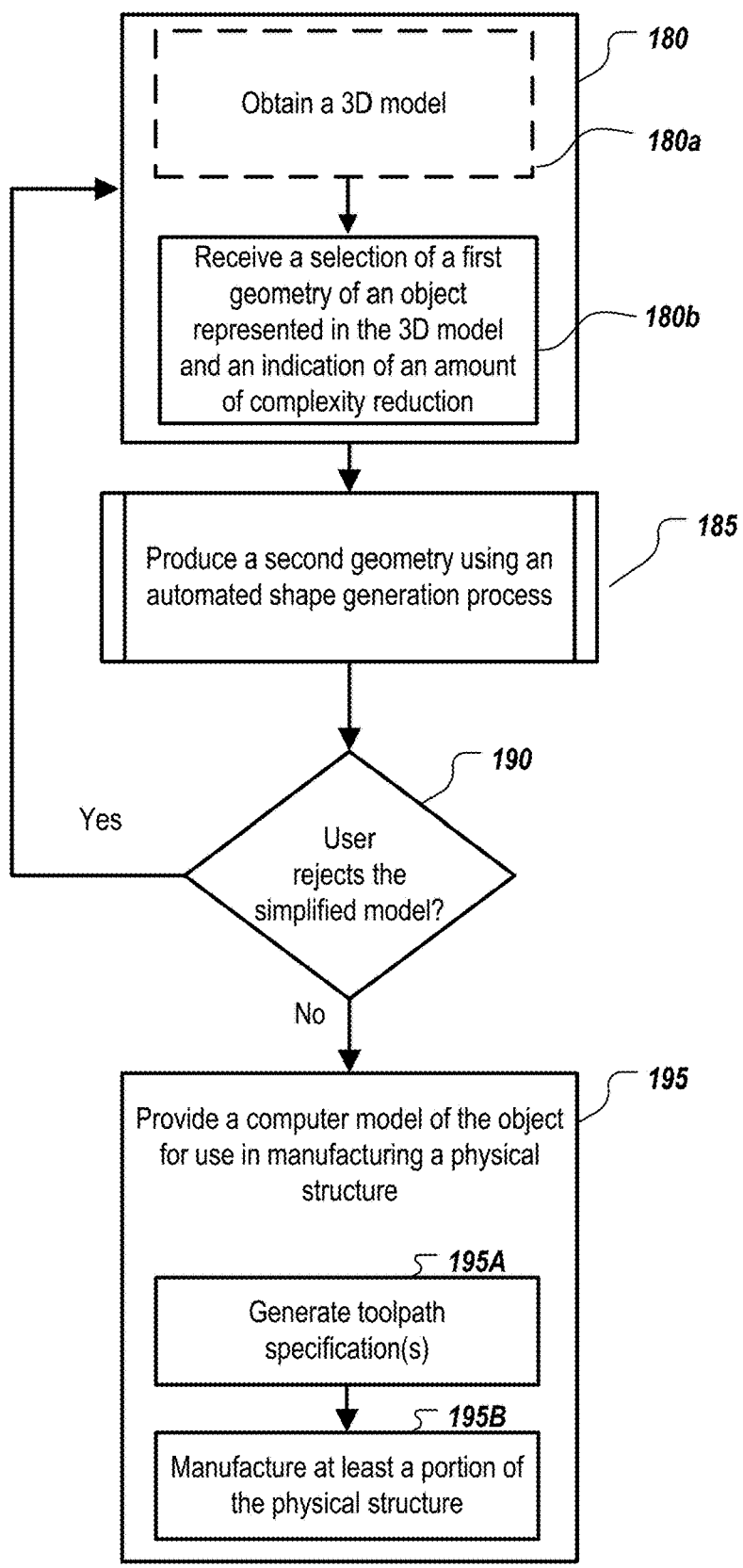
FIG. 1B shows an example of a process of automated shape reconstruction.

FIG. 1B shows an example of a process of automated shape reconstruction. In general, a shape modeling computer program (e.g., CAD program(s) 116) receives 180 a selection of a first geometry defined in a data structure used by the shape modeling computer program and an indication of an amount of complexity reduction, and produces 185 a second geometry defined in the data structure for the first geometry using an automated shape reconstruction process based on the amount of indicated complexity reduction and taking into account local shape curvature for the first geometry.

The first geometry can be a polygon mesh output from an automated shape generation process, e.g., a generative design solver, or a polygon mesh generated from a smooth surface representation of a 3D model. In some implementations, the receiving 180 of the first geometry includes obtaining 180*a* a 3D model by the automated shape generation process, e.g., by a generative design/shape synthesis process. At times, an output first geometry of the automated shape generation process may include a shape complexity that exceeds a desired complexity, e.g., is unreasonable, expensive, and/or difficult to manipulate, manufacture, etc., such that a user may desire to use the automated shape reconstruction to generate a simplified second geometry from the first geometry. In some implementations, the receiving 180 the first geometry includes receiving 180*b* the selection first geometry of the object represented in the 3D model and the indication of the amount of complexity reduction, where the first geometry is the output of an automated shape generation process. Selection of the first geometry can include user selection of portions of the 3D model using user interface tools of the CAD program(s) 116.

The second geometry can be a control mesh for a smooth surface representation, for example, a T-Spline surface model, B-Spline surface model, or a quad mesh control frame, where the second geometry replaces the first geometry in representing the three-dimensional model of the object.

In the case of automated shape reconstruction (e.g., automated shape remodeling), a selected portion (or all) of a modeled object and the indication of the amount of complexity reduction are received 180*b*, e.g., by CAD program (s) 116, for use in generating a simplified 3D model. The amount of complexity reduction can be indicative of one or more shape complexity reduction objectives. For example, shape complexity reduction objectives can include, but are not limited to, ease of manufacturability, reducing a number of faces, and increasing prismatification (e.g., prismatic versus organic features), and are used to drive the automated shape reconstruction process towards simplified models.

In some implementations, the receiving 180*b* of the indication of complexity reduction can be provided by a user through UI 122 of the shape modeling computer program. The indication of complexity reduction can be provided as one or more inputs to the automated shape reconstruction process. The target complexity reduction can be defined by the user as a desired amount of complexity reduction for generating the second geometry from the first geometry. A complexity reduction can include (A) a reduction in a number of faces in the output model representation of the object, (B) a threshold smoothness to generate a smoother shape profile and/or a more readily editable smooth surface representation of the object, (C) a transition from organic features to prismatic features (e.g., a ratio or percentage of each), or (D) any combination thereof. A user can input a desired complexity reduction using the UI 122 of the shape modeling computer program, e.g., using one or more dynamic input controls 123 presented in the UI 122. In one example, a complexity reduction amount can be a value within a range of values, e.g., a value between 1-10. In another example, a user can indicate a complexity reduction amount by interacting with dynamic control(s) presented as visual indicator(s) (e.g., sliding scale bar, dial/knob, etc.) in the UI of the shape modeling computer program. The shape modeling computer program can receive the desired complexity reduction and translate the desired complexity reduction to a usable input format for an automated shape generation process.

In some implementations, a user can input a desired complexity reduction by directly specifying curve or surface types to be used in the construction of the 3D model. For example, by inputting a requirement for circular cross-sections. In another example, a user can specify tangential continuity constraints (C0, C1, C2) between connecting beams. A selection of a final surface representation (e.g., B-Spline or T-Spline) can also be input by the user to control the complexity reduction.

In some implementations, a user may not provide one or more of the required inputs to inform the generation of the simplified model. In such cases, the shape modeling computer program can use automated process inputs. For example, the shape modeling computer program can generate one or more process inputs based in part on an appearance of the first geometry, an indicated end-use of the second geometry, or the like. In another example, the shape modeling computer program can use a user-specified intended manufacturing method, e.g., 3D printing, 3-axis or 5-axis CNC, to generate one or more process inputs, e.g., where a complexity reduction can be increased when simpler tooling is required. In another example, a user-input desired cost of manufacture can be used to generate one or more process inputs, e.g., where a complexity reduction can generally lead to a reduced cost of manufacture.

The indication of complexity reduction can include geometric objectives for the simplified model. The geometric objectives can be provided by a user or from the CAD program(s) 116 to ensure certain characteristics of the shape are preserved and/or realized, e.g., to provide a shape that is easier to manufacture, or to preserve particular features of the original model. For example, the geometric objectives can be defined to ensure that the generated simplified shape can have no tiny features. In another example, the geometric objectives can include weight and smoothness of the generated second geometry. In another example, the geometric objectives can include a ratio of organic versus prismatic features of the second geometry. The geometric objectives can include details for preserve regions that should be present in the simplified model or identify locations on which the automated shape reconstruction methods should not be applied (e.g., where simplification is not desired), or such locations and regions can be excluded from shape reconstruction by not being included in the selection portions of the 3D model to be reconstructed.

Different automated shape reconstruction processes can be selected based in part on received shape complexity reduction criteria. In some implementations, the shape complexity reduction criteria can be received as an input through UI 122. Different automated shape reconstruction processes can be used, e.g., by CAD program(s) 116 in response to input from the user 160. A user 160 can select between different automated shape reconstruction methods based in part on a starting input mesh, a level of complexity reduction/prismatification for an output model, ease of manufacture/manipulation of the output model, and the like. In addition, the user 160 can be allowed to specify a sequence of automated shape reconstruction processes, where the output of the first shape reconstruction process (e.g., Mesh-to-Pipes) is used as input to the second shape reconstruction process (e.g., Regeneration).

In some implementations, 3D model(s) that are produced 185 can be for use in additive manufacturing, subtractive manufacturing (e.g., manufactured using a 2.5-axis subtractive manufacturing process), and/or other manufacturing systems and techniques.

In any case, the production 185 of 3D model(s) can involve modifying, e.g., by CAD program(s) 116, a 3D shape of the modeled object to reduce a complexity of the 3D shape of the modeled object and/or simplify the 3D shape of the modeled object represented in the 3D model(s).

The output of the automated shape reconstruction process is a control mesh of a smooth surface representation of the 3D model of the object. The output can be a boundary representation model (B-rep), T-Spline surface model, B-spline surface model, or quad mesh control frame. In any case, the output 3D model of the object can be fully editable, e.g., using UI tools to interact with the control mesh of the second geometry in the reconstructed 3D model, in the CAD program(s) 116, and such editing can be much easier to do in light of the reduce complexity of the 3D model. In addition, in some implementations, the 3D model produced by the automated shape reconstruction process can be a watertight 3D model.

The result of the automated shape reconstruction process can be presented to the user, e.g., in UI 122 on display device 120, along with an option 190 to accept or reject the simplified model. For example, a 3D model produced 185 by the processing can be presented to the user 160 in UI 122. In some implementations, the simplified model can be presented in UI 122 with a reconstruction report, e.g., documentation related to a reduction in complexity of the second geometry versus the first geometry. For example, a report can include information related to a reduction in face count of the control mesh of the second geometry. A user can review the simplified model and reconstruction report and determine whether to update the desired complexity reduction or to accept the simplified model.

In some implementations, the user can view the original geometry and the simplified geometry in the UI 122. The presentation of the original and simplified geometries can include indicate, e.g., highlight, outline, or otherwise distinguish, differences between the original and simplified geometries.

In some implementations, two or more simplified 3D models resulting from the production 185 process, e.g., each constructed using a different amount of complexity reduction, can be presented to the user along with trade-off analysis of complexity versus cost of manufacturing, e.g., based on the amount of external support structure that will be needed, or any of a variety of other quantities of interest. The UI 122 can assist a user 160 to accept or reject one or more 3D models among the presented 3D models.

In some implementations, the user can select to further update the desired complexity reduction to generate an updated simplified model. The user can indicate, e.g., through UI 122, an updated desired complexity reduction amount such that a new simplified geometry is reconstructed from the original geometry and the updated simplified geometry is presented in the UI 122, e.g., replacing the previously presented simplified geometry or alongside one or more previously presented simplified geometries.

If the design is rejected, the process of FIG. 1B can return to receive 180, e.g., by CAD program(s) 116, new criteria, e.g., desired shape complexity reduction value(s), new selection of the first geometry in the 3D model, and/or selection of a different automated shape reconstruction process or process sequence, for use in producing a second geometry from the first geometry. Once a design is not rejected 190, the process of FIG. 1B can provide 195, e.g., by CAD program(s) 116, the model of the object for use in manufacturing a physical structure. The providing 195 can involve sending or saving the 3D model to a permanent storage device for use in manufacturing the physical structure corresponding to the object using manufacturing systems. In some implementations, the providing 195 involves generating 195A, e.g., by CAD program(s) 116, toolpath specifications for computer-controlled manufacturing system(s) using the computer model, and manufacturing 195B, e.g., by CAD program(s) 116, at least a portion of the physical structure corresponding to the object with the computer-controlled manufacturing system(s) using the toolpath specifications. In some implementations, the providing 195 can include manufacturing 195B a mold for a physical structure with a manufacturing machine using the toolpath specification generated 195A, where the computer model can be a model of the mold that will be manufactured using a subtractive manufacturing process. The computer model that is provided 195 can be the computer model produced 185 by the automated shape reconstruction method.

Various automated shape generation methods can be used to produce 185 a new geometry. Described herein are two automated shape generation processes that can be implemented by the shape modeling computer program. As described in further detail below, automated shape generation processes include (A) a Mesh-to-Pipes process and (B) a Regeneration process. Automated shape generation processes can be implemented by a shape modeling computer program and applied at different points of a workflow to produce a new geometry having simplified or reduced complexity, and which can offer ease of manufacture, editing/manipulation and/or rendering over an original, input geometry.

In some implementations, a user can indicate, e.g., through a UI of the shape modeling computer program, a selection of at least a portion of a geometry of the 3D model representative of the object and an amount of target complexity reduction for the selected portion. The selection of at least a portion of the geometry can be the entire 3D model of the object, or less than the entire 3D model of the object.

In some implementations, the shape modeling computer program can provide guidance to the user through the UI on selections of the geometry of the 3D model representative of the object that are candidate regions that are selectable for reduction of complexity. For example, in the case of mesh-to-pipes process, the shape modeling computer program can perform an analysis of the input mesh and highlight regions where complexity can be reduced, e.g., regions where the mesh cross-sections are approximately circular.

Figure 14:
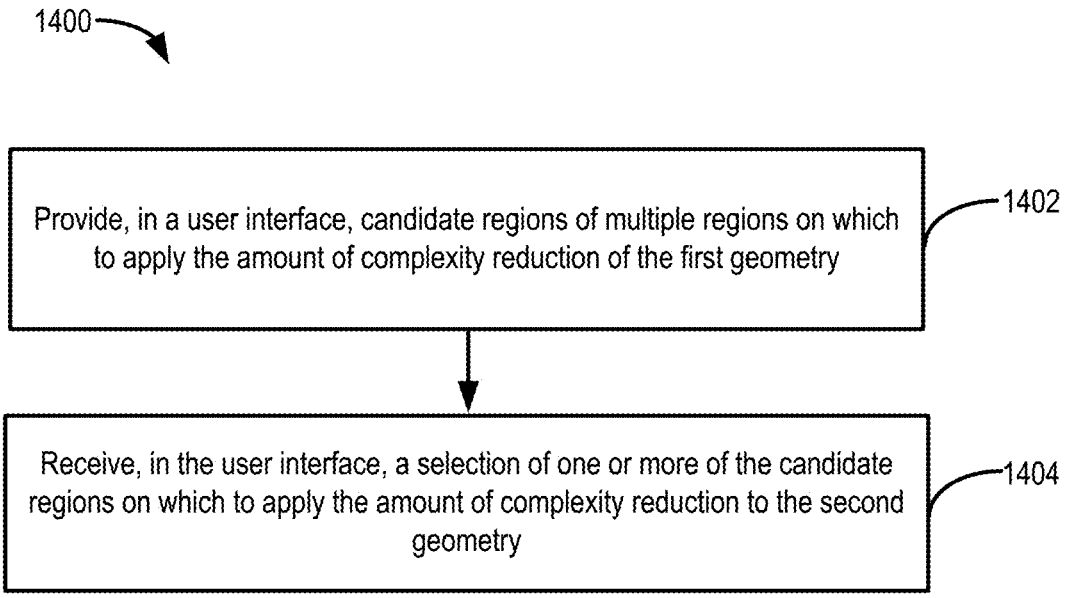
FIG. 14 is a flow diagram of an example of an automated shape reconstruction process.

FIG. 14 is a flow diagram of an example of an automated shape reconstruction process 1400. The shape modeling computer program provides 1402 candidate regions of multiple regions on which to apply the amount of complexity reduction of the first geometry. For example, the UI can highlight, outline, or otherwise indicate candidate regions having at least a threshold complexity (e.g., at least a threshold density of mesh). The computer program receives 1404 a user selection of one or more of the candidate regions on which to apply an automated shape generation process in addition to, or instead of, user-identified geometry selections of the 3D model.

An automated shape reconstruction method of two or more automated shape reconstruction methods can be selectively applied by the shape modeling program to the selected geometry to generate a refined geometry based on the indicated complexity reduction, where the refined geometry replaces the selected geometry of the original 3D model representation of the object. An automated shape generation method can be selected from multiple options, for example, directly by a user indication through the UI of the shape modeling computer program.

Figure 15:
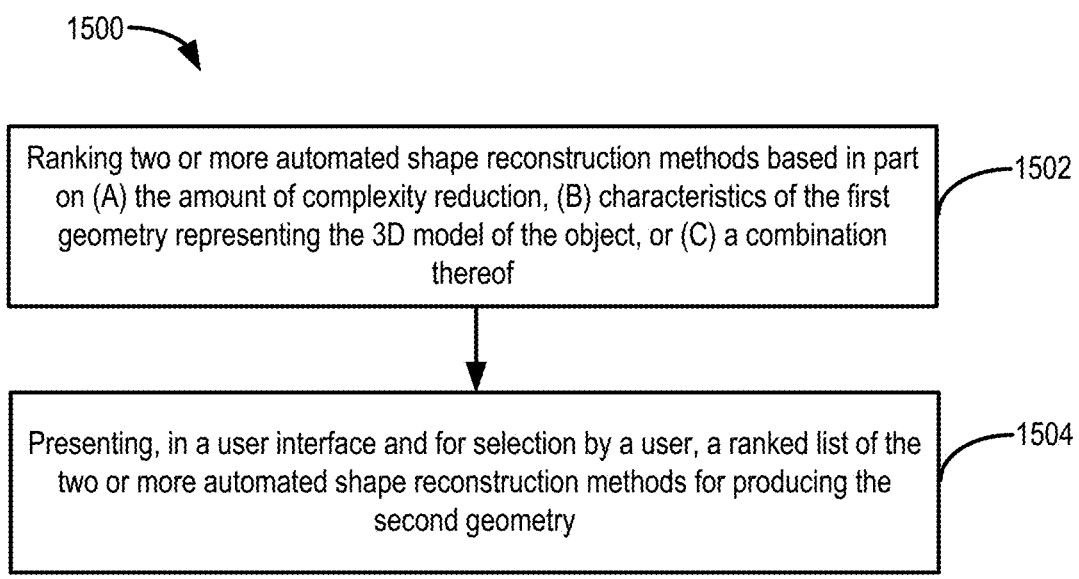
FIG. 15 is a flow diagram of an example of an automated shape reconstruction process.

In some implementations, an automated shape reconstruction method of two or more available methods can be selected by the shape modeling computer program based in part on the user inputs (e.g., the amount of target complexity reduction) and/or characteristics of the geometry of the 3D model representative of the object. The shape modeling computer program can present, to the user, options for performing the automated shape reconstruction and can provide a ranked list of the options with indicators of benefits of each option. FIG. 15 is a flow diagram of an example of an automated shape reconstruction process 1500. The computer program ranks 1502 two or more automated shape reconstruction methods based in part on (A) an indication of an amount of complexity reduction, (B) characteristics of the first geometry representing the 3D model of the object, or (C) a combination thereof. For example, for a first indication of an amount of complexity reduction, the computer program can rank using a mesh-to-pipes method above a regeneration method. The computer program presents 1504 the ranked list of the two or more automated shape reconstruction methods for producing the second geometry in a user interface (e.g., UI 122) for selection by a user.

An output from the automated shape reconstruction methods can be an output model reflecting an organic nature of the original input mesh and having reduced complexity and/or increased prismatic aspects from the original mesh input. For example, the second geometry can account for a local shape curvature of the first geometry, where a degree of curvature at each point of the first geometry can be used to generate one or more points of the second geometry.

The output 3D model from the automated shape generation method can be provided for use in manufacturing a physical structure corresponding to the object using one or more computer-controlled manufacturing systems. For example, additive and/or subtractive manufacturing systems can be used to produce a physical structure corresponding to the object. The output 3D model can be provided for use in displaying the object on a display screen, e.g., digital projection for a computer animation application.

Mesh-to-Pipes Method

Figure 2:
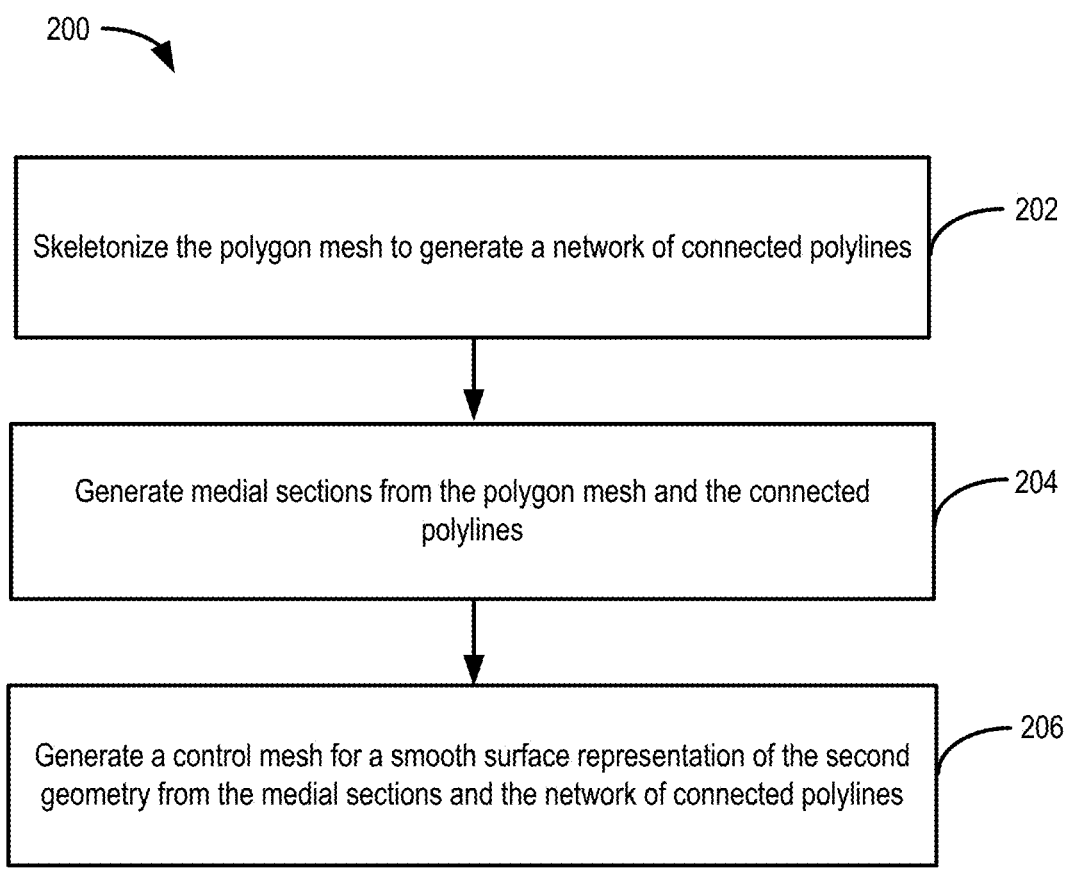
FIG. 2 is a flow diagram of an example of an automated shape reconstruction process.

In some implementations, an automated shape generation method is a mesh-to-pipes method, where the mesh-to-pipes method implemented by the shape modeling computer program generates a control mesh for a smooth surface representation of a second geometry from a first geometry of the input mesh. FIG. 2 is a flow diagram of an example of an automated shape generation process 200. FIGS. 3A-3F show different stages of an example of a process of automated shape reconstruction. The first geometry that is input to the shape modeling program can be represented in a polygon mesh (FIG. 3A), e.g., an output polygon mesh from a GD solver. In some instances, the first geometry is a smooth surface representation of a 3D model, where a polygon mesh is generated by the shape modeling computer program from the first geometry.

Figure 3A:
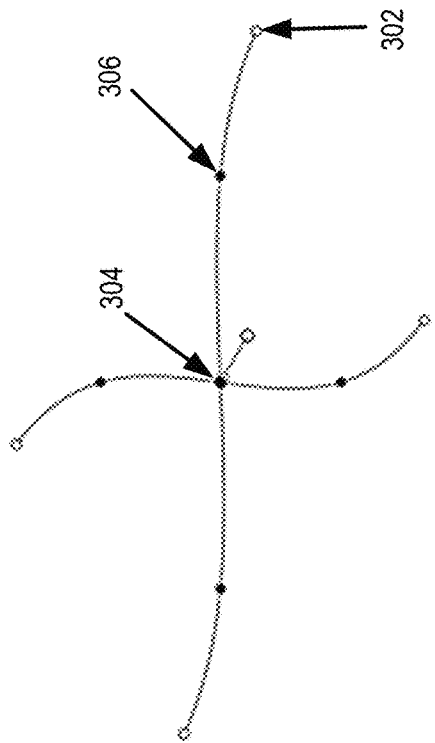
FIGS. 3A-3F show different stages of an example of a process of automated shape reconstruction.
Figure 3B:
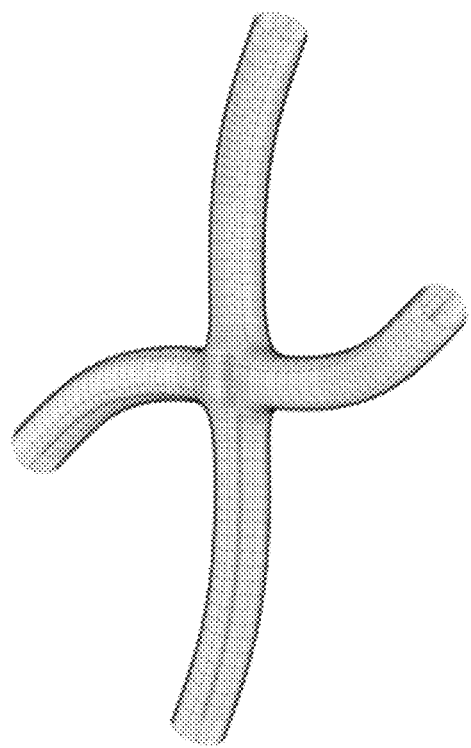

Generating a second geometry of the 3D model(s) using the mesh-to-pipes method includes generating a network of collected polylines representing the first geometry (e.g., FIG. 3B). In some implementations, the shape modeling computer program generates 202 a line skeleton including a network of connected regular primitives (e.g., polylines) that approximate the first geometry. The shape modeling computer program captures a topology of the first geometry. A mean curvature algorithm can be used to contract the input model into degenerate curves (or surfaces) and extract a curve skeleton network based on the contraction. For example, using a mean curvature algorithm as described in *Mean curvature skeletons*; Tagliasacchi, Andrea, Alhashim, Ibraheem, Olson, Matt, and Zhang, Hao; Computer Graphics Forum (Proceedings of the Symposium on Geometry Processing), 31(5):1735-1744, 2012, or another suitable algorithm of the model to skeletonize the polygon mesh and produce a network of connected polylines.

In some implementations, a voxelized line skeleton of the first geometry is found by iteratively shrinking the input mesh to a generate a skeleton framework. For example, a voxelized line skeleton can be identified for the three-dimensional shape, for example, by using the thinning algorithm described in *Building Skeleton Models via 3-D Medial Surface Axis Thinning Algorithms*; Lee, Ta-Chih and Kashyap, Rangasami; 6, s.l.: Academic Press, Inc., 1994; CVGIP: Graphical Models and Image Processing, Vol. 56, pp. 462-478, hereafter the "Lee and Kashyap algorithm") with adjustments made to not permit skeleton end points, i.e. every set of line skeleton voxels begins and ends either in a preserve or in a junction with another chunk of line skeleton and there are no "fingers" stretching off into space. Also, voxels can be fixed in each of the preserves such that they cannot be removed by the thinning. These modifications cause the resulting line skeleton to be a subset of the true medial axis that reflects the connectivity of the shape between the preserves while maintaining a path close to the geometric center of each arm of that connectivity, avoiding protrusions and other noisy artifacts that sometimes occur in medial axis construction by thinning. Other voxelized thinning algorithms can be used, for example, algorithms described in *Improved 3D Thinning Algorithms for Skeleton Extraction*; She, F. H., Chen, R. H., Gao, W. M., Hodgson, P. H., Kong, L. X., Hong, H. Y. Proceedings of the Digital Image Computing: Techniques and Applications (DICTA), Melbourne, Australia, 1-3 Dec. 2009; pp. 14-18, and *A Fully Parallel 3D Thinning Algorithm and Its Applications*; Ma, C. M., Sonka, M. Comput. Vis. Image Underst. 1996, 64, 420-433.

In any case, the generated network of connected polylines includes a set of points (e.g., nodes) points corresponding to first locations of endpoints of the polylines of the network of connected polylines (e.g., endpoint 302 in FIG. 3B), and a second number of points corresponding to second locations of intersections between at least two polylines of the network of connected polylines (e.g., intersection 304 in FIG. 3B).

Figure 3D:
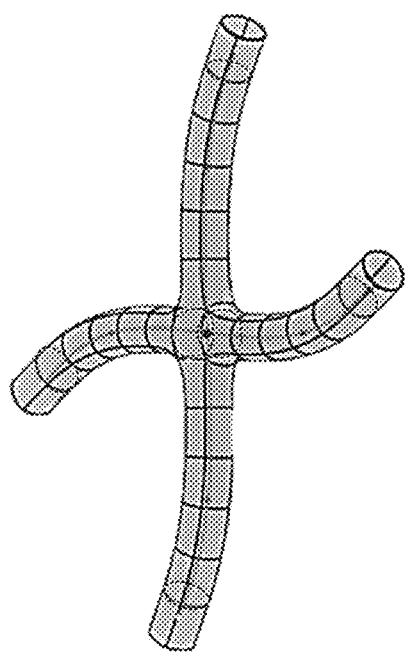
Figure 3C:
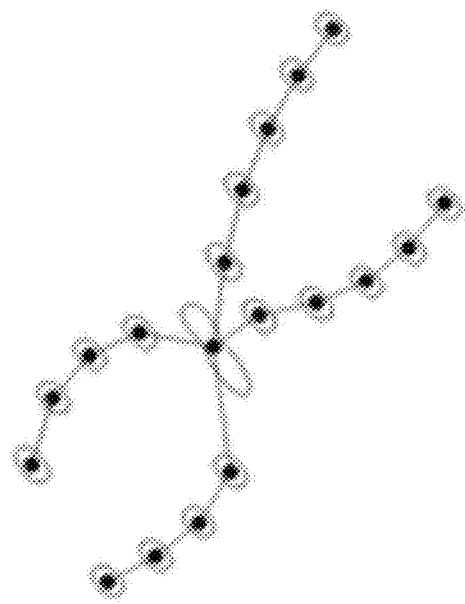
Figure 3F:
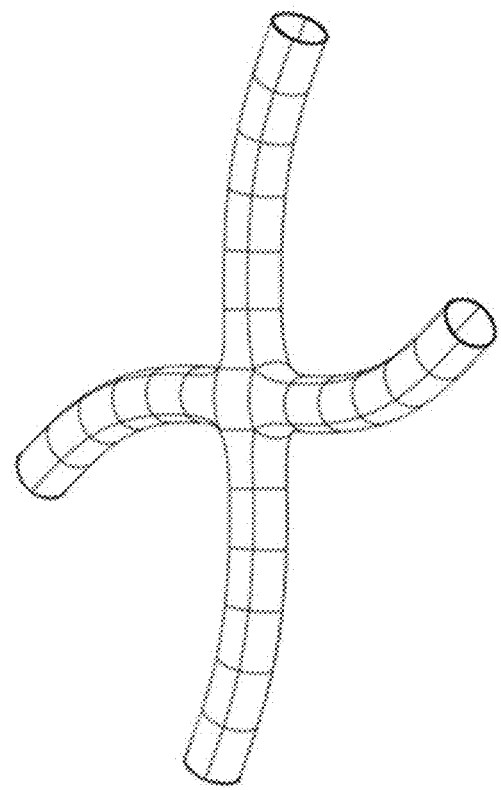
Figure 3E:
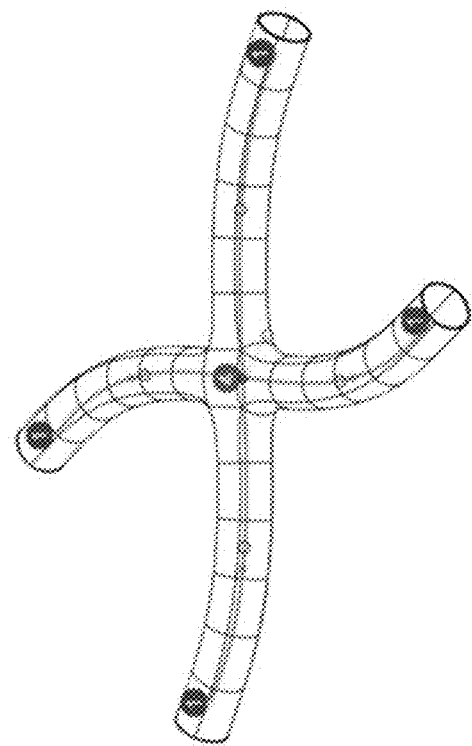

Referring back to FIG. 2, the shape modeling computer program generates 204 medial sections based on the polygon mesh, the connected polylines, and the amount of desired complexity reduction (e.g., FIG. 3C). Each medial section of the generated medial sections corresponds to a cross-section of the polygon mesh captured orthogonally to the network of connected polylines. The cross-section of the polygon mesh that is used to generate the medial section includes curvature information for the polygon mesh at the point along the polyline of the network of connected polylines. A number of medial sections that are generated can be based in part on the indicated complexity reduction input by the user (or a default complexity reduction). In other words, a complexity reduction input can dictate the fidelity of the second geometry to the first geometry for high degree(s) of curvature of the first geometry. For example, a section of the polygon mesh having higher curvature will yield a greater number of medial sections than a section of the polygon mesh having lower curvature. Thus, as the complexity reduction increases, the number of medial sections created for the same portion of the input mesh will decrease.

Figure 6:
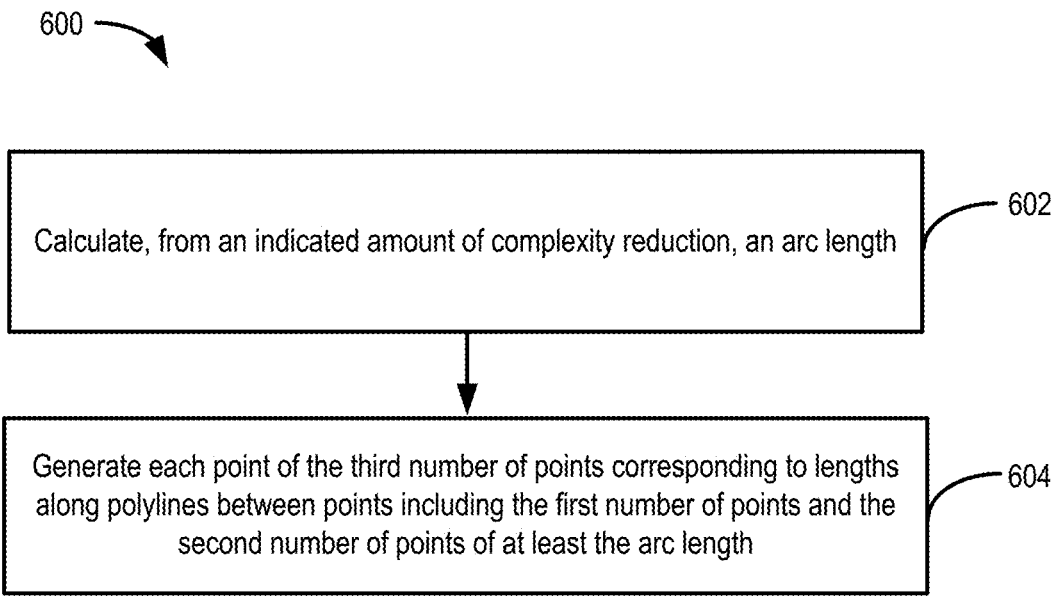
FIG. 6 is a flow diagram of an example of an automated shape reconstruction.

In some implementations, the complexity reduction input can define an arc length parameter used to define points along the polylines to add additional medial sections. A spacing between adjacent medial sections can depend in part on the distance along a curve of the polygon mesh, e.g., the arc length. For example, a lower arc length means a shorter distance between nodes generated from the network of connected polylines, e.g., endpoints and intersections of polylines, and locations at which one or more new nodes are added, e.g., midpoints along polylines of the network of connected polylines. FIG. 6 is a flow diagram of an example of an automated shape reconstruction process 600. The computer program calculates 602 an arc length from the complexity reduction input. The computer program generates 604 a third number of points, e.g., midpoints, corresponding to lengths along the polylines between neighboring points (e.g., endpoints and/or intersection points) of at least the arc length (e.g., midpoint 306 in FIG. 3B). In such cases, a generated second geometry can more closely align with a curvature of the first (original) geometry. It should be noted that a shape can curve in many different directions in 3D space, and so the segments of the polyline can extend in many different directions in a 3D design space.

In some implementations, a user can provide an updated indication of a complexity reduction amount through the UI of the shape modeling computer program. The shape modeling computer program can calculate an updated arc length based on the updated indication of complexity reduction amount and adjust (e.g., add or remove) at least one midpoint of the third number of points corresponding to third locations of midpoints along respective polylines of the network of connected polylines in response to the updated arc length.

Figure 5:
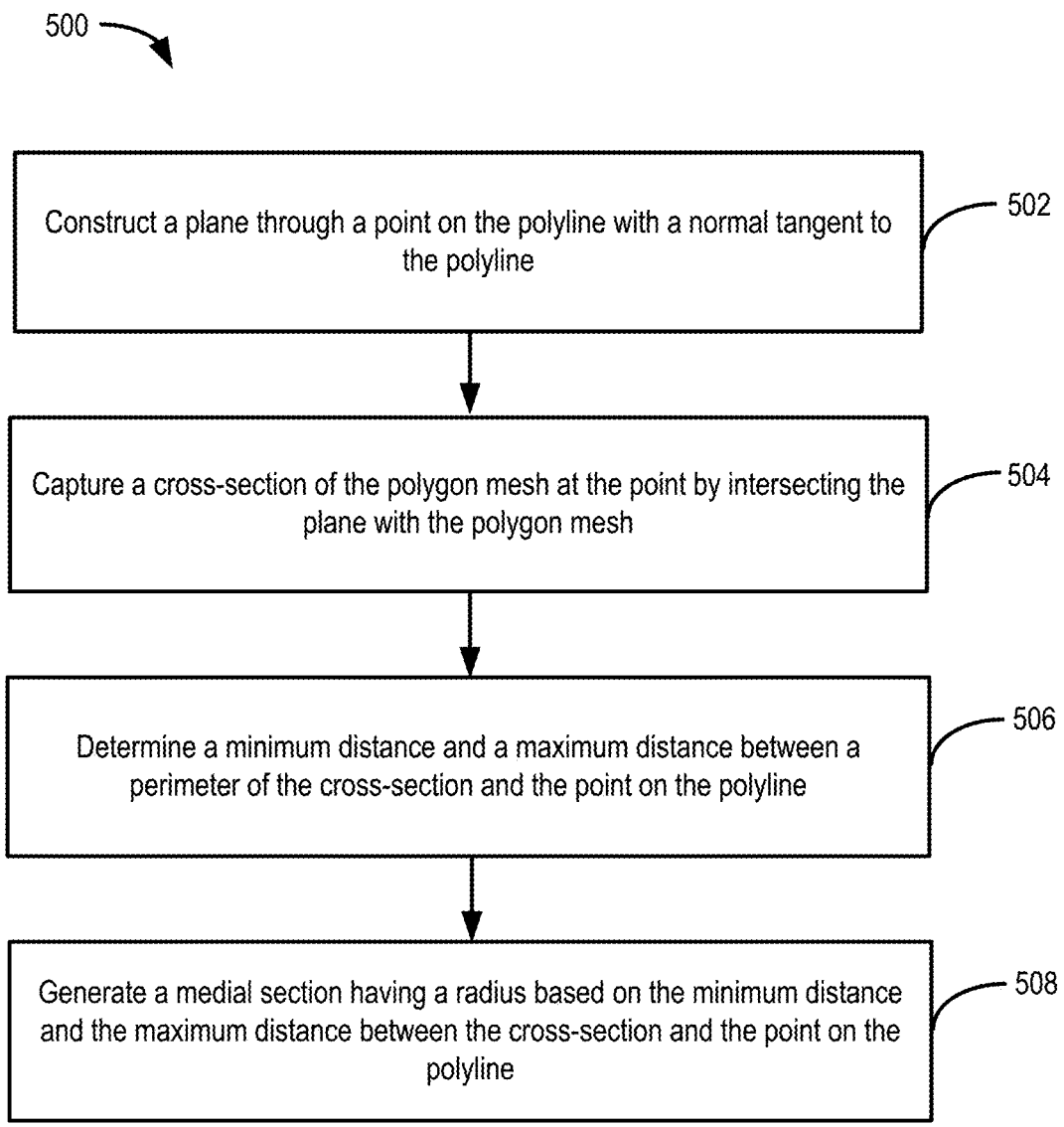
FIG. 5 is a flow diagram of an example of an automated shape reconstruction process.

In some implementations, as depicted in the flow diagram of an example of an automated shape reconstruction process 500 of FIG. 5, the shape modeling computer program generates a medial section by constructing 502 a plane through a point on the polyline with a normal that is tangent to the polyline. The shape modeling computer program captures 504 a cross-section of the polygon mesh by slicing the polygon mesh with the constructed plane at the polyline point. For each generated cross-section of the polygon mesh, the shape modeling computer program determines 506 a minimum and maximum distance between the cross-section of the polygon mesh (e.g., a perimeter of the cross-section intersecting with the constructed plane) and the polyline point and generates 508 a medial section for the pipe network based on the minimum and maximum distances. For example, the medial section for the pipe network can be generated with a cross-sectional area having a radial value based on the minimum and maximum distances, e.g., equal to an average distance of the minimum and maximum distances.

Figure 7:
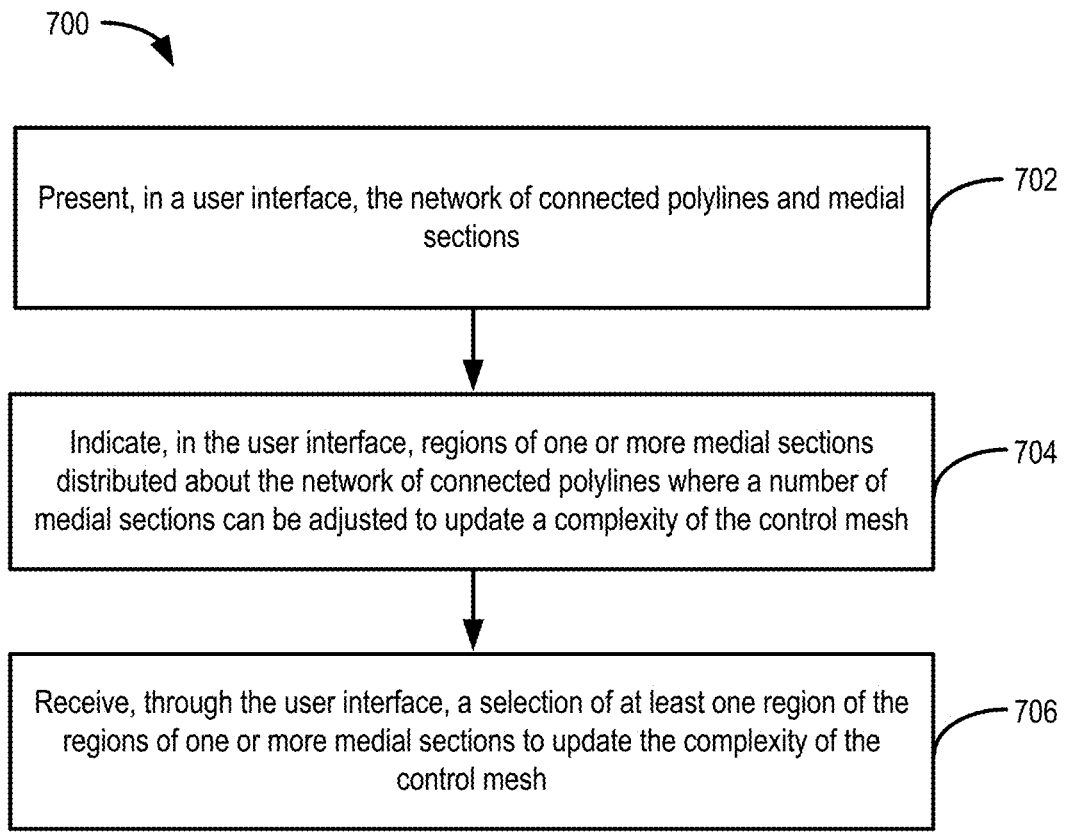
FIG. 7 is a flow diagram of an example of an automated shape reconstruction.

In some implementations, a user can select to add and/or remove one or more medial sections generated by the shape modeling computer program through the UI of the shape modeling computer program. FIG. 7 is a flow diagram of an example of an automated shape reconstruction process 700. The computer program can present 702 in a user interface (e.g., UI 122) the network of connected polylines and medial section. The UI can guide the user by indicating 704 (e.g., by highlighting, outlining, or otherwise identifying) regions of the medial sections distributed about the network of connected polylines where medial sections can be added/removed to adjust a complexity of the output control mesh. The computer program can receive 706 a user selection through the UI of at least one region of the regions of one or more medial sections to update the complexity of the control mesh. A complexity of the generated control mesh for the smooth surface representation of the second geometry can be adjusted by adjusting the number of medial sections that are constructed for each branch of the network of connected polylines. A lower number of medial sections results in less complexity but more deviation from the input model.

Referring back to FIG. 2, the shape modeling computer program generates 206, from the set of medial sections, a control mesh for a smooth surface representative of the second geometry from the medials distributed and the network of connected polylines. For each polyline of the network of connected polylines, the computer program generates a corresponding B-spline curve approximating the polyline. The computer program determines a closest point on the corresponding B-Spline curve to a midpoint of the polyline and sets a medial location to a parametric value of the determined closest point. The computer program can convert the generated B-Spline curves to corresponding T-Spline curves.

To generate the smooth surface representation (e.g., T-spline pipe surface) from the set of T-spline curves and the medial sections, the computer program adds a pipe handle for each medial section (e.g., FIG. 3D). The pipe handle radius can be set as an average radius for the pipe handle if two or more polylines meet at the handle location, or a maximum radius value for pipe handles corresponding to single polylines. The computer program can specify a tolerance to detect curve intersections within the given tolerance (e.g., FIG. 3E). The computer program creates, from the pipe handles and set of T-spline curves, a smooth joint at each curve intersection, and generates a smooth surface representation of the 3D model of the object (e.g., FIG. 3F).

Figure 4A:
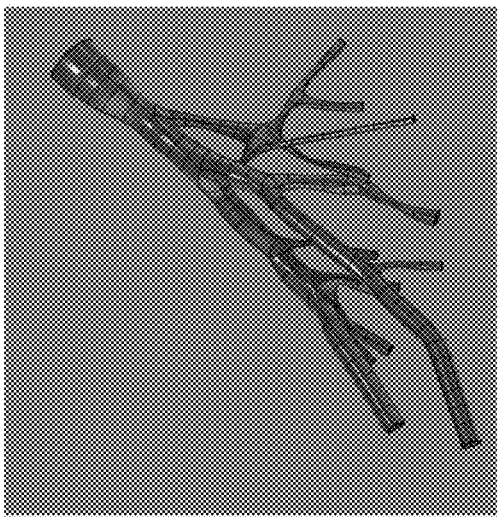
FIGS. 4A-4B show examples of output control meshes from the automated shape reconstruction process.
Figure 4B:
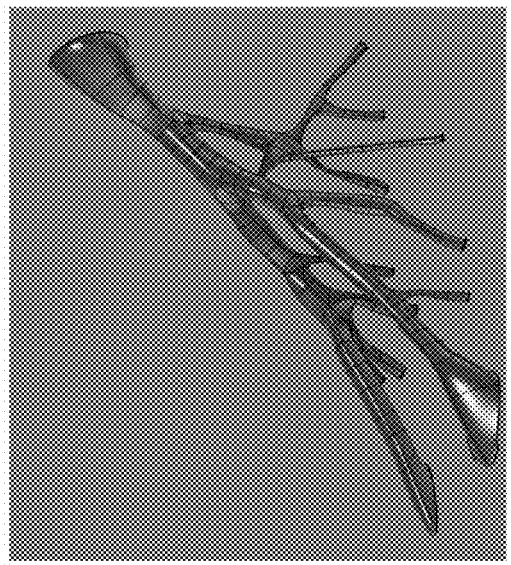

In some implementations, a user may adjust one or more aspects of the output control mesh, e.g., using manual editing, through the UI of the shape modeling computer program. FIGS. 4A-4B show examples of output control meshes from the automated shape generation process. For example, a user may interact with the UI to adjust the second geometry (e.g., FIG. 4A) of the output control mesh to align with (e.g., match) the first geometry (e.g., FIG. 4B).

In some implementations, the UI of the shape modeling computer program includes a comparative display of the first geometry defined in polygon mesh and the second geometry defined in the control mesh, e.g., as overlapping or side-byside renderings. A matching function can be used by the shape modeling program to highlight, outline, or otherwise identify for a user the differences between the first and second geometries to facilitate adjusting the second geometry to align with the first geometry. A user can interact with the UI to adjust the number of medial sections to increase or decrease a number of medial sections used for constructing the second geometry. For example, increasing the number of medial sections will add more faces in the constructed control mesh.

Regeneration Method

Figure 8:
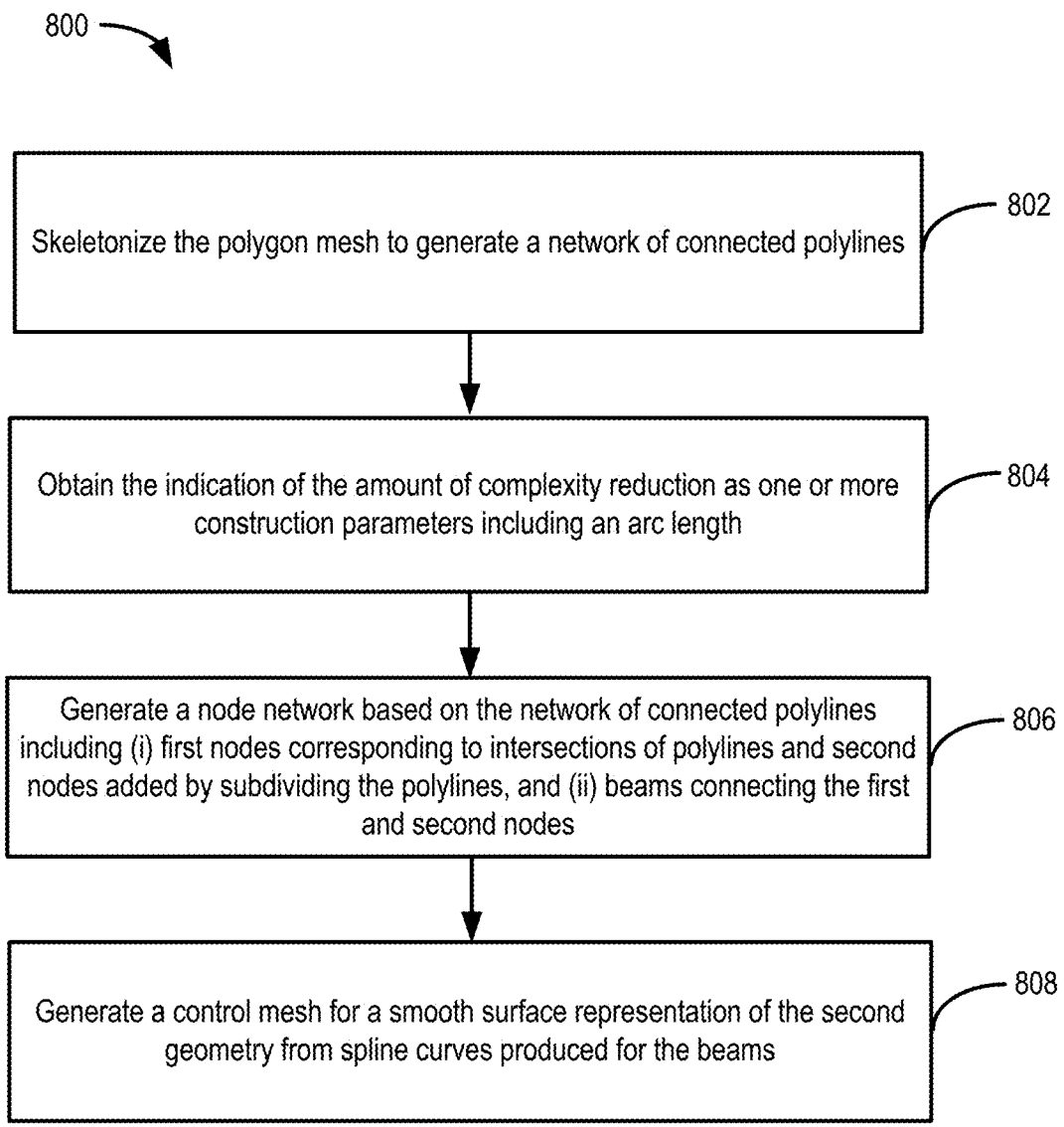
FIG. 8 is a flow diagram of an example of an automated shape reconstruction process.

In some implementations, an automated shape generation method is a regeneration method, where the regeneration method implemented by the shape modeling computer program generates a control mesh for a smooth surface representation of the second geometry from the input mesh. FIG. 8 is a flow diagram of an example of an automated shape reconstruction process 800. FIGS. 9A-9F show different stages of an example of a process of automated shape reconstruction.

Figure 9B:
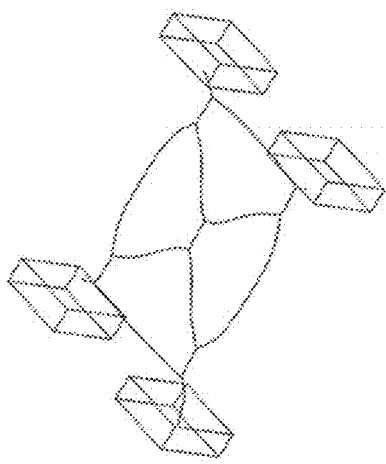
FIGS. 9A-9F show different stages of an example of a process of automated shape reconstruction.
Figure 9A:
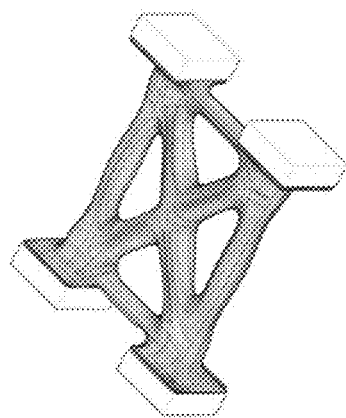

As described above, the shape modeling computer program obtains a first geometry represented in a polygon mesh (e.g., FIG. 9A, which shows a polygon mesh generated between four preserve bodies) and generates 802 a line skeleton including a network of connected regular primitives (e.g., polylines) that approximate the first geometry (e.g., FIG. 9B). The shape modeling computer program captures a topology of the first geometry, for example, using a mean curvature algorithm, or another suitable algorithm of the model to skeletonize the polygon mesh and produce a network of connected polylines.

The computer program obtains 804 the indication of the amount of complexity reduction as one or more construction parameters including an arc length. The arc length can be used by the shape modeling computer program to determine locations of the second nodes in the node network. A lower arc length means a shorter distance between a node generated from the network of polylines and a new node being added. In such cases, a generated second geometry can more closely align with a curvature of the first (original) geometry. An amount of complexity reduction input by a user can control how closely the second geometry is aligned with curvature of the first geometry. For example, a complexity reduction input can dictate the fidelity of the second geometry to the first geometry for high degree(s) of curvature of the first geometry. It should be noted that a shape can curve in many different directions in 3D space, and so the segments of the polyline can extend in many different directions in a 3D design space.

Figure 9D:
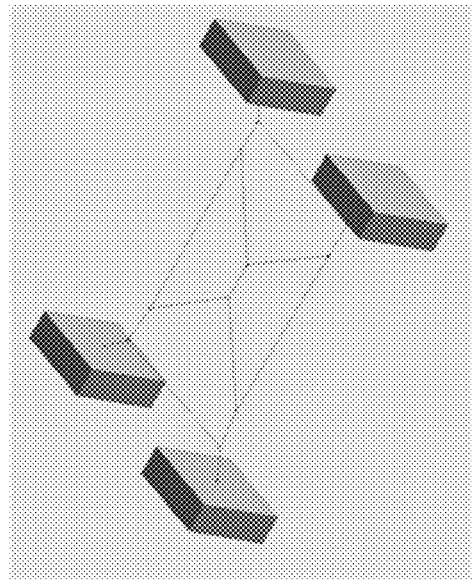
Figure 9C:
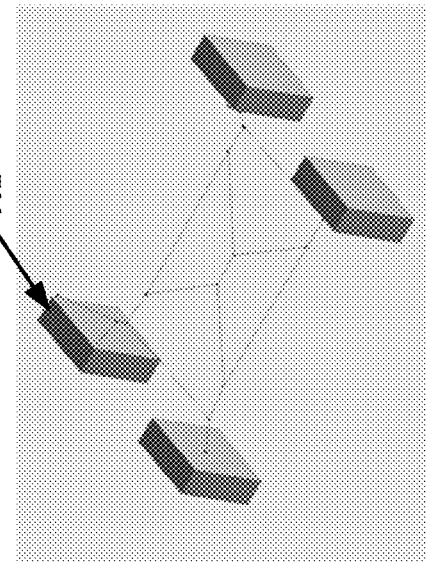

The shape modeling computer program generates 806 a node network based on the network of connected polylines extracted from the line skeleton (e.g., FIG. 9C). The network of connected polylines can be fitted with curved or other complex geometry, e.g., with beams connecting neighboring nodes and one or more preserve bodies, e.g., preserve body 902, associated with the network of connected polylines. In some examples, one or more beams are curved beams generated by fitting a curve to approximate a polyline of the network of connected polylines, e.g., a medial axis of a portion of the first 3D shape. For example, for every polyline of the network of connected polylines, a B-Spline or another curve can be fit to approximate the portion of the line skeleton corresponding to that polyline.

The node network includes a first set of nodes corresponding to intersections of the connected polylines of the network of connected polylines. The node network includes a second set of nodes added to the node network by subdividing the connected polylines based on one or more construction parameters calculated from a user input complexity reduction.

Figure 10:
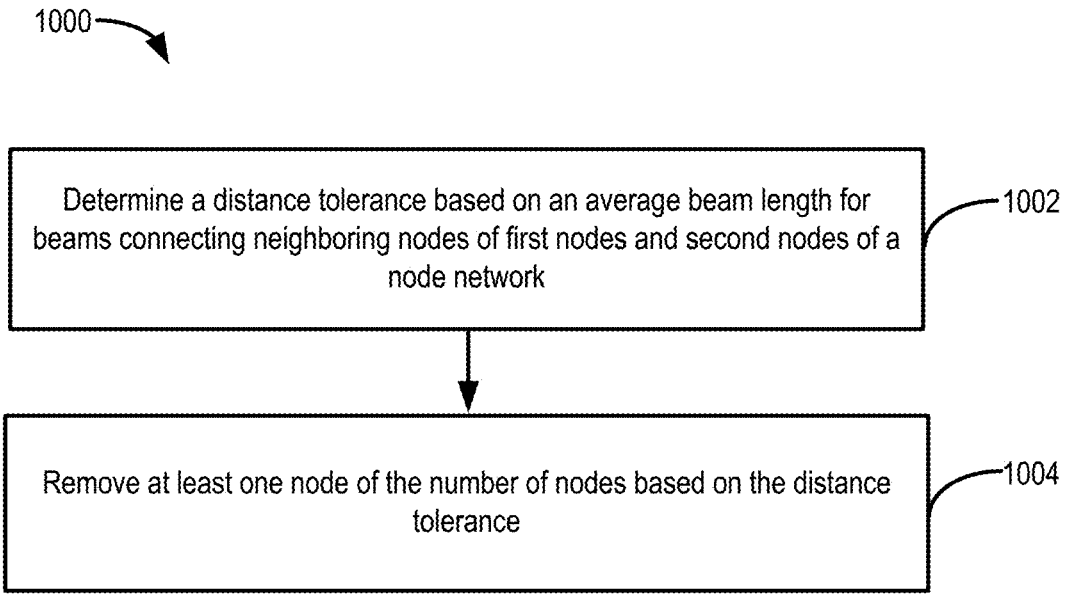
FIG. 10 is a flow diagram of an example of an automated shape reconstruction process.

In some implementations, the shape modeling computer program can implement a pruning algorithm to adjust a number/density of nodes and trim the generated node network to generate a simplified node network (e.g., FIG. 9D). FIG. 10 is a flow diagram of an example of an automated shape reconstruction process 1000. Pruning a number/density of nodes can include determining 1002, by the shape modeling computer program, a distance tolerance based on an average beam length for the beams connecting the neighboring nodes of the node network. For each preserve body the nearest node located closest to a center point of the preserve body contact face is identified. For nodes that are within the distance tolerance, the node position is adjusted to the closest point on the contact face of the preserve body. For nodes outside the distance tolerance, the beams within the region of the preserve body are removed 1004 until a node is identified that is connected to a single beam, and a beam is constructed connecting the identified node to the center point of the contact face of the preserve body. In some instances, a user provided complexity reduction amount can be used by the shape modeling computer program to implement the pruning algorithm and reduce a number/density of nodes in the simplified node network. For example, a complexity value can set a distance tolerance used to remove more or fewer nodes during the pruning process.

In some implementations, a user can provide one or more construction parameters including values specifying a complexity, smoothness, and weight, of the second geometry. An interplay between the construction parameters can impact an appearance of the second geometry produced from the first geometry by the shape modeling computer program. Generally, lower values for one or more of these will result in more simplification of the output model as compared to the input model. A low complexity value can result in simple struts whereas a high value can result in more branching and more highly curved branches. A low smoothness value can result in sharp edges whereas high values can result in a smoother model (e.g., more blends, more organic surfaces). For example, a smoothness value of 1 can result in a second geometry with rectangular cross-sections whereas a value of 2 can trigger a second geometry with circular cross-sections. A low weight value can result in thin struts whereas high values can result in thickened struts and/or more variable thickness.

Referring back to FIG. 8, the shape modeling computer program can generate 808, from the node network and using the construction parameters, a control mesh for a smooth surface representation of the second geometry. Generating the control mesh includes generating spline curves (e.g., B-spline curves) corresponding to the beams connecting the nodes of the node network. Constructing B-Spline curves includes using the end node positions and preserve body contact faces. For a node lying on a preserve body contact face, the shape modeling computer program defines a curve as tangent to the normal of the contact face of the preserve body. For a node not lying on a preserve body contact face, the shape modeling computer program defines a curve as a tangent to an average of all tangents for adjoining beams of the beam network.

Figure 11:
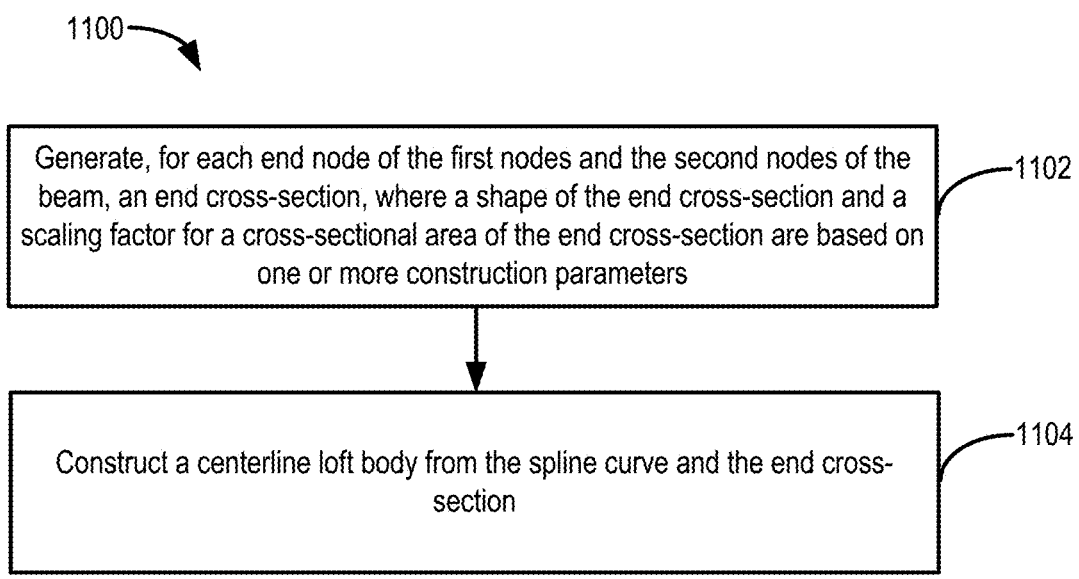
FIG. 11 is a flow diagram of an example of an automated shape reconstruction process.

FIG. 11 is a flow diagram of an example of an automated shape reconstruction process 1100. At each end node, the shape modeling computer program generates 1102 a corresponding end cross-section, where a shape of the end cross-section depends in part on a user input of the construction parameters. A smoothness value for the construction parameters can dictate a cross-sectional shape. For example, the shape of the cross-section can be specified as rectangular, circular, radius rectangle, etc. A first smoothness value can result in construction of struts with rectangular cross-section, a second smoothness value can result in construction of struts with circular cross-section. A third smoothness value can result in construction of struts with radius rectangle cross-section, where the third value is greater than the second value is greater than the first value.

An area of the cross-section can be scaled based on the user input of the construction parameters, e.g., weight value of the construction parameters can be used to scale the area of the cross-section. Scaling of an area of the cross-section for nodes located on a preserve body contact face can be limited to avoid overlapping the edges of the contact face of the preserve body.

Figure 9F:
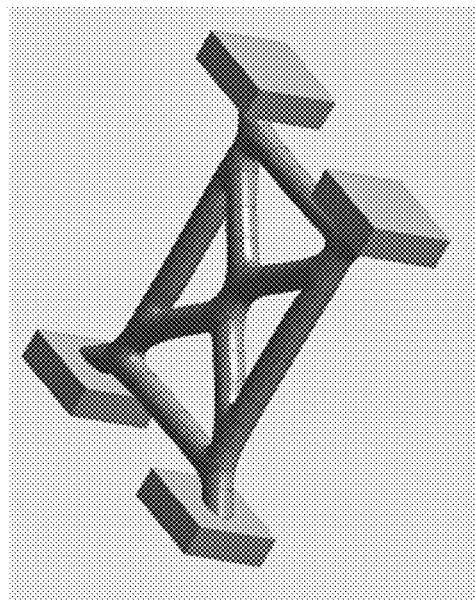
Figure 9E:
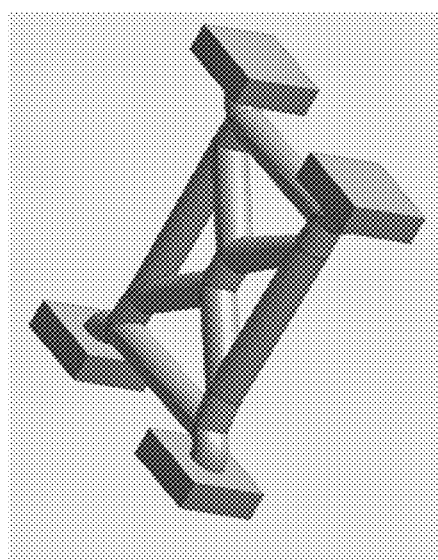

In some implementations, the shape modeling computer program determines, based on the provided one or more construction parameters, to use a B-Spline surface construction, T-spline surface construction, or quad mesh control frame construction for generating the second geometry. The shape modeling computer program can select to use a B-spline surface construction approach based in part on the construction parameters. For example, a smoothness value provided by the user as one or more construction parameters can be used by the computer program to select whether to use a B-spline surface construction or T-spline surface construction approach to construct the second geometry. As depicted in FIGS. 9E and 9F, for a same node network generated, the computer program can select a B-spline surface construction (e.g., FIG. 9E) or a T-spline surface construction (e.g., FIG. 9F) based in part on one or more values for the construction parameters, e.g., based on the smoothness input parameter.

In some implementations, the shape modeling computer program selects to use a B-Spline surface construction approach to construct the second geometry (e.g., FIG. 9E). For each beam of the node network, the shape modeling computer program constructs a B-spline curve using the end node positions and tangent values. For nodes lying on a preserve contact face, the tangent is selected as a normal of the contact face of the preserve. For nodes not lying on a preserve contact face, the tangent is selected as an average of tangent values for all adjoining beams to the beam including the node.

The shape modeling computer program generates a cross-section for each end node, where a cross-sectional shape can be selected by the computer program based on the user-provided construction parameters, e.g., a smoothness parameter value. The cross-section is scaled by the computer program based on the user-provided construction parameters, e.g., a weight parameter value. A scaling factor can be limited (e.g., capped) for cross-sections corresponding to nodes lying on the contact face of the preserve, e.g., to avoid overlapping edges of the contact face with the constructed cross-section.

The shape modeling computer program constructs 1104 a centerline loft body from the B-Spline curve and end cross-sections to generate a B-Spline surface construction of the second geometry. The centerline loft body transitions (e.g., interpolates) between end cross-sections and maintains continuity of the curvature between the end cross-sections to generate connected surfaces. For example, the B-spline surface construction as described by *The NURBS Book*; Piegl, L., Tiller, W.; Springer Science & Business Media, 6 Dec. 2012, p. 448.

Figure 12:
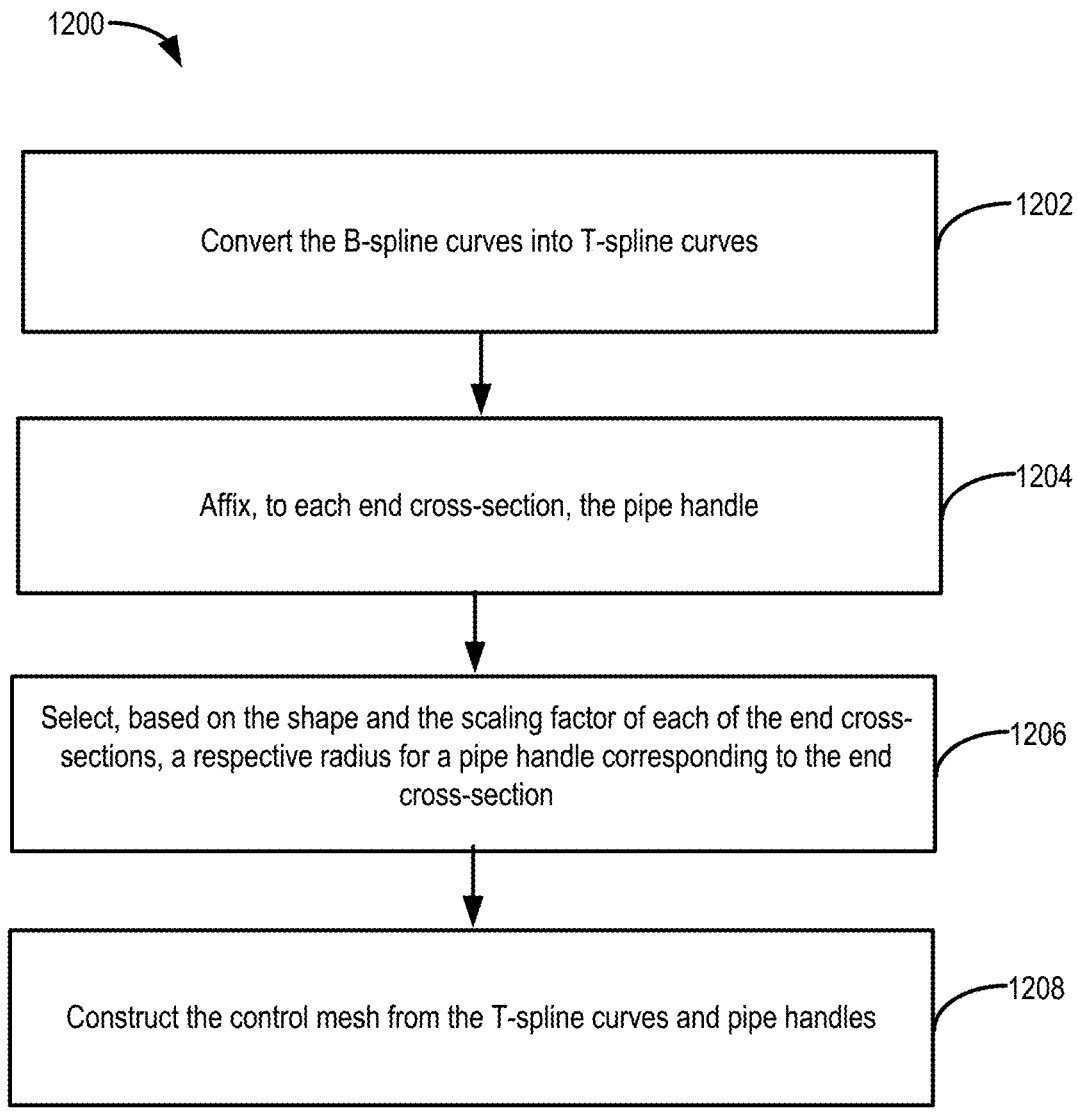
FIG. 12 is a flow diagram of an example of an automated shape reconstruction process.

In some implementations, the shape modeling computer program can determine, based in part on a smoothness value provided by the user, to generate the second geometry using a T-spline construction method (e.g., FIG. 9F). FIG. 12 is a flow diagram of an example of an automated shape reconstruction process 1200. In response to determining to construct the second geometry using the T-spline construction method, the computer program converts 1202 the B-Spline curves generated as described above into T-spline curves and affixes 1204 pipe handles at locations of the cross-sections at the nodes of the node network.

A radius for each pipe handle is selected 1206 based on a cross-sectional shape of the cross-sections. For example, a pipe handle radius for a circular cross-section is set to a same radius as the radius of the circular cross-section. In another example, a pipe handle radius for a rectangular or radiused rectangle cross-section is set to an approximation (e.g., a best fit radius) corresponding to the cross-section. For a rectangular cross-section, the approximation used is the half length of the diagonal (D). For a radiused rectangular cross-section, the approximation is $D+r(1-\sqrt{2})$, where r is the corner radius. The shape modeling program constructs 1208 the control mesh for the smooth surface representation of the second geometry based on the network of T-spline curves and pipe handles.

In some implementations, a user can interact with the UI of the shape modeling program to adjust the one or more construction parameters. Adjusting the one or more construction parameters impacts the construction of the control mesh for the smooth surface representation of the second geometry. For example, adjusting the one or more construction parameters can impact a construction of a ratio of organic versus prismatic characteristics of the control mesh for the smooth surface representation of the second geometry.

Figure 13:
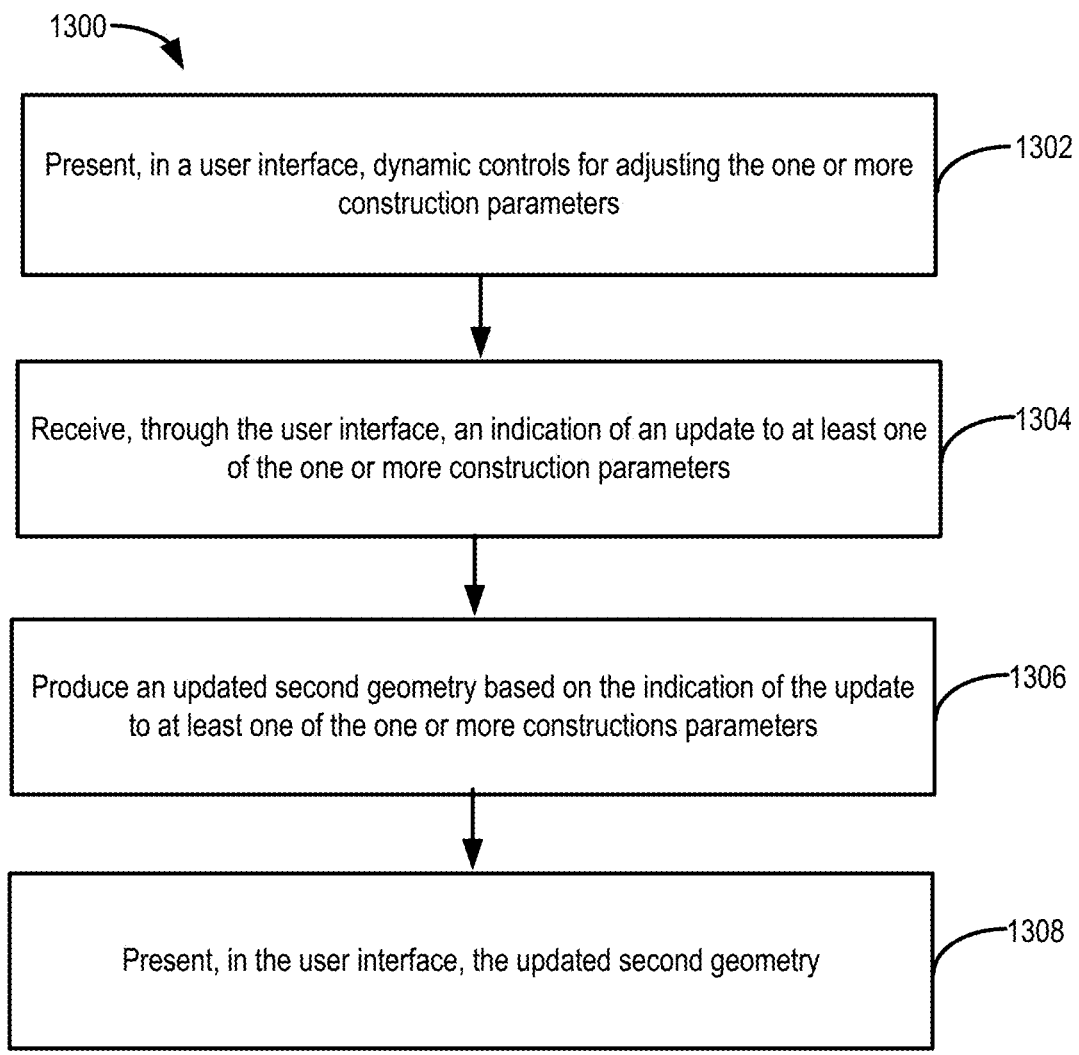
FIG. 13 is a flow diagram of an example of an automated shape reconstruction process.

In some implementations, a user can view the generated second geometry and adjust the input parameters to regenerate the second model and view the impact of the complexity reduction, in order to achieve a target complexity reduction and/or gain understanding of what a complexity reduction looks like in real-time. FIG. 13 is a flow diagram of an example of an automated shape reconstruction process 1300. The shape modeling computer program can present 1302 dynamic controls for adjusting the one or more construction parameters in a user interface, e.g., UI 122. Dynamic controls can include, for example, a sliding scale bar, dial, knob, or another virtual adjustable indicator that the user can manipulate to update one or more of the construction parameters. Separate dynamic controls can be presented for each of the one or more construction parameters. In some implementations, an adjustment of one dynamic control for a construction parameter can result in an automatic update to another dynamic control for a different construction parameter, e.g., for construction parameters that may be linked.

The computer program can receive 1304 an indication of an update to at least one of the one or more construction parameters from a user through the user interface and produce 1306 an updated second geometry based on the indication of the update to the at least one of the one or more construction parameters. The computer program presents 1308 the updated second geometry in the user interface for review by the user. In some implementations, the computer program presents two or more generated second geometries corresponding to respective values for the one or more construction parameters to assist the user in understanding impacts of adjusting the one or more construction parameters on the second geometry.

Figure 16:
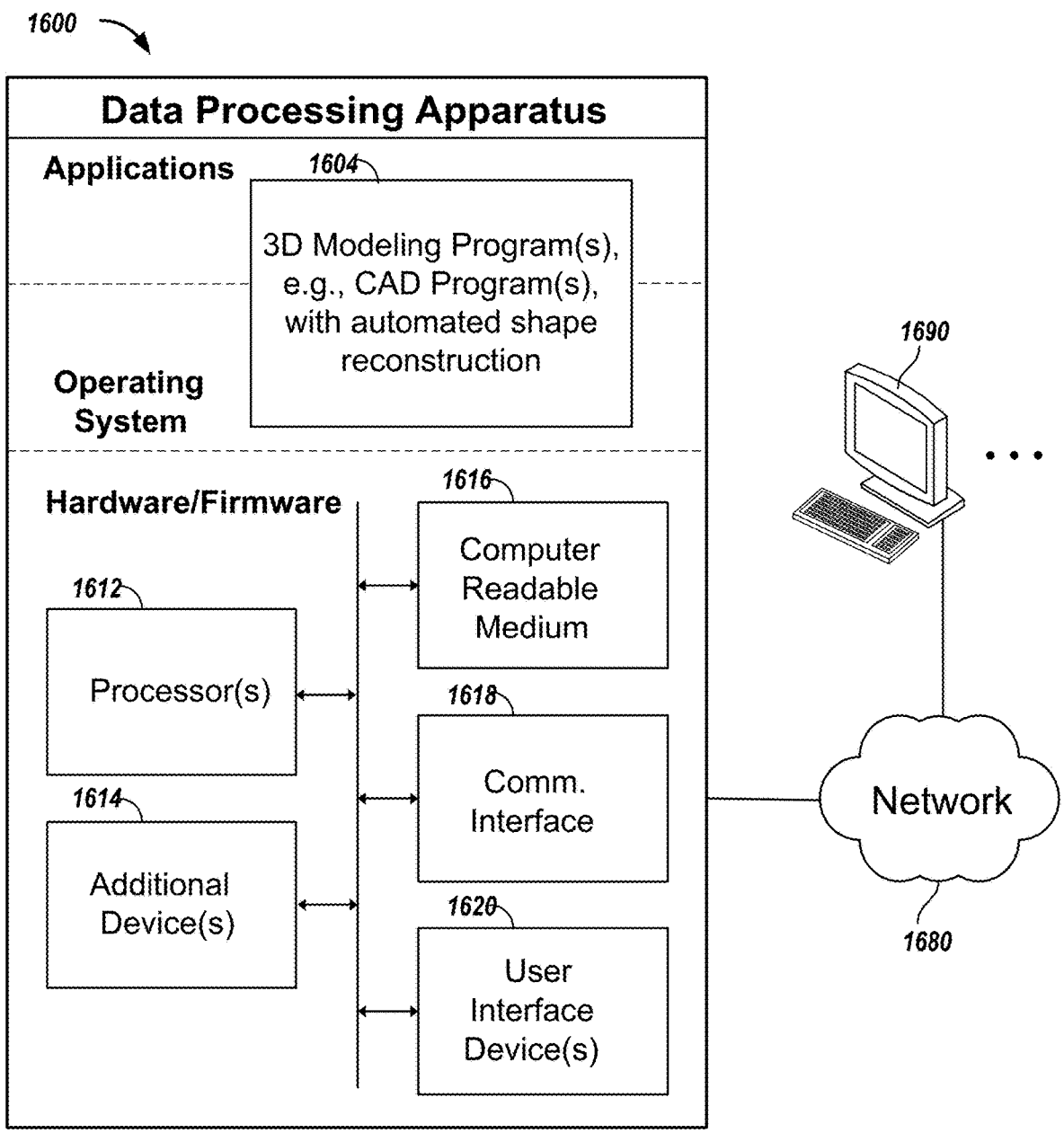
FIG. 16 is a schematic diagram of a data processing system including a data processing apparatus, which can be programmed as a client or as a server, and implement the techniques described in this document.

FIG. 16 is a schematic diagram of a data processing system including a data processing apparatus 1600, which can be programmed as a client or as a server. The data processing apparatus 1600 is connected with one or more computers 1690 through a network 1680. While only one computer is shown in FIG. 16 as the data processing apparatus 1600, multiple computers can be used. The data processing apparatus 1600 includes various software modules, which can be distributed between an applications layer and an operating system. These can include executable and/or interpretable software programs or libraries, including tools and services of one or more 3D modeling programs 1604 that implement automated shape reconstruction and/or automated shape generation, as described above. Thus, the 3D modeling program(s) 1604 can be CAD program(s) 1604 (such as CAD program(s) 116) and can implement one or more automated shape generation methods and/or one or more automated shape reconstruction methods. Further, the program(s) 1604 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 1600 also includes hardware or firmware devices including one or more processors 1612, one or more additional devices 1614, a computer readable medium 1616, a communication interface 1618, and one or more user interface devices 1620. Each processor 1612 is capable of processing instructions for execution within the data processing apparatus 1600. In some implementations, the processor 1612 is a single or multi-threaded processor. Each processor 1612 is capable of processing instructions stored on the computer readable medium 1616 or on a storage device such as one of the additional devices 1614. The data processing apparatus 1600 uses the communication interface 1618 to communicate with one or more computers 1690, for example, over the network 1680. Examples of user interface devices 1620 include a display, a camera, a speaker, a microphone, a tactile feedback device, a keyboard, a mouse, and VR and/or AR equipment. The data processing apparatus 1600 can store instructions that implement operations associated with the program(s) described above, for example, on the computer readable medium 1616 or one or more additional devices 1614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
receiving, by a shape modeling computer program, a selection of first geometry defined in a data structure used by the shape modeling computer program to represent a three-dimensional model of an object and an indication of an amount of complexity reduction, wherein the first geometry is defined in the data structure using a polygon mesh or the polygon mesh is generated from the first geometry;
producing, by the shape modeling computer program, second geometry defined in the data structure based on the indication of the amount of indicated complexity reduction and taking into account local shape curvature for the first geometry, wherein the second geometry replaces the first geometry in representing the three-dimensional model of the object, wherein the producing comprises:
skeletonizing the polygon mesh to produce a network of connected polylines;
generating medial sections from the polygon mesh and the connected polylines, each of the medial sections corresponding to a cross-section of the polygon mesh captured orthogonal to the network of connected polylines and comprising curvature information for the polygon mesh at the cross-section, wherein a number of the medial sections generated is based on the indication of the amount of desired complexity reduction; and
generating a control mesh for a smooth surface representation of the second geometry from the medial sections and the network of connected polylines representing the polygon mesh representing the first geometry; and
providing, by the shape modeling computer program, the three-dimensional model of the object, with the second geometry included in the three-dimensional model, for use in manufacturing a physical structure corresponding to the object using one or more computer-controlled manufacturing systems, or for use in displaying the object on a display screen.

2. The method of claim 1, wherein generating a medial section of the medial sections comprises, for each polyline of the network of connected polylines:
constructing a plane through a point on the polyline with a normal tangent to the polyline;
capturing the cross-section of the polygon mesh at the point by intersecting the plane with the polygon mesh;
determining a minimum distance and a maximum distance between a perimeter of the cross-section and the point on the polyline;
generating, the medial section based on the minimum distance and the maximum distance between the cross-section and the point on the polyline.

3. The method of claim 2, wherein generating, the medial section based on the minimum distance and the maximum distance between the cross-section and the point on the polyline comprises:
  determining an average distance between the perimeter of the cross-section and the point on the polyline; and
  generating the medial section having a radius corresponding to the average distance.

4. The method of claim 2, further comprising determining the number of the medial sections generated based on the indication of the amount of desired complexity reduction comprising:
  generating a first number of points corresponding to first locations of endpoints of polylines of the network of connected polylines;
  generating a second number of points corresponding to second locations of intersections between at least two polylines of the network of connected polylines; and
  generating a third number of points corresponding to third locations of midpoints along respective polylines of the network of connected polylines.

5. The method of claim 4, wherein generating the third number of points corresponding to third location of midpoints along respective polylines of the network of connected polylines comprises:
  calculating, from the indicated amount of complexity reduction, an arc length; and
  generating each point of the third number of points corresponding to lengths along polylines between points including the first number of points and the second number of points of at least the arc length.

6. The method of claim 5, further comprising:
  receiving an updated indication of a complexity reduction amount;
  calculating an updated arc length based on the updated indication of complexity reduction amount; and
  adjusting at least one point of the third number of points in response to the updated arc length.

7. The method of claim 1, further comprising:
  presenting, in a user interface, the network of connected polylines and medial sections;
  indicating, in the user interface, regions of one or more medial sections distributed about the network of connected polylines wherein a number of medial sections can be adjusted to update a complexity of the control mesh for the smooth surface representation of the second geometry;
  receiving, through the user interface, a selection of at least one region of the regions of one or more medial sections to update the complexity of the control mesh.

8. The method of claim 1, wherein the first geometry is defined in the data structure using a polygon mesh, and the polygon mesh is output from an automatic 3D geometry generation algorithm.

9. The method of claim 1, further comprising,
  providing, in a user interface, candidate regions of a plurality of regions on which to apply the amount of complexity reduction of the first geometry representing the three-dimensional model of the object; and
  receiving, in the user interface, a selection of one or more of the candidate regions on which to apply the amount of complexity reduction to produce the second geometry.

10. A method comprising:
  receiving, by a shape modeling computer program, a selection of first geometry defined in a data structure used by the shape modeling computer program to represent a three-dimensional model of an object and an indication of an amount of complexity reduction, wherein the first geometry is defined in the data structure using a polygon mesh or the polygon mesh is generated from the first geometry;
  producing, by the shape modeling computer program, second geometry defined in the data structure based on the indication of the amount of indicated complexity reduction and taking into account local shape curvature for the first geometry, wherein the second geometry replaces the first geometry in representing the three-dimensional model of the object, wherein the producing comprises:
    skeletonizing the polygon mesh to produce a network of connected polylines representing the first geometry;
    obtaining the indication of the amount of desired complexity reduction as one or more construction parameters for the second geometry, the one or more construction parameters comprising an arc length;
    generating a node network based on the network of connected polylines, the node network comprising (i) first nodes corresponding to intersections of the connected polylines and second nodes added by subdividing the connected polylines based on the arc length, and (ii) beams connecting the first and second nodes; and
    generating a control mesh for a smooth surface representation of the second geometry from spline curves produced for the beams; and
  providing, by the shape modeling computer program, the three-dimensional model of the object, with the second geometry included in the three-dimensional model, for use in manufacturing a physical structure corresponding to the object using one or more computer-controlled manufacturing systems, or for use in displaying the object on a display screen.

11. The method of claim 10, further comprising adjusting a number of nodes of the first nodes and the second nodes, where the adjusting comprises:
  determining a distance tolerance based on an average beam length for the beams connecting neighboring nodes of the first nodes and the second nodes of the node network; and
  removing at least one node of the number of nodes based on the distance tolerance.

12. The method of claim 10, wherein generating the control mesh from spline curves produced for the beams comprises, for each beam of the beams of the node network:
  generating, for each end node of the first nodes and the second nodes of the beam, an end cross-section, wherein a shape of the end cross-section and a scaling factor for a cross-sectional area of the end cross-section are based on the one or more construction parameters; and
  constructing a centerline loft body from the spline curve and the end cross-section.

13. The method of claim 12, wherein the spline curves are B-spline curves, and wherein generating the control mesh from spline curves produced for the beams further comprises:
  converting the B-spline curves into T-spline curves;
  determining, based on the shape and the scaling factor of each of the end cross-sections, a respective radius for a pipe handle corresponding to the end cross-section;
  affixing, to each end cross-section, the pipe handle; and generating the control mesh from the T-spline curves and pipe handles.

14. The method of claim 10, further comprising:
presenting, in a user interface, dynamic controls for adjusting the one or more construction parameters;
receiving, through the user interface, an indication of an update to at least one of the one or more construction parameters;
producing, an updated second geometry defined in the data structure based on the indication of the update to at least one of the one or more construction parameters; and
presenting, in the user interface, the updated second geometry.

15. The method of claim 10, wherein generating the control mesh for the smooth surface representation of the second geometry from spline curves produced for the beams comprises:
determining, based on the indication of the amount of desired complexity reduction as the one or more construction parameters for the second geometry, to generate the control mesh as a B-Spline surface construction or as a T-Spline surface construction.

16. The method of claim 10, wherein the first geometry is defined in the data structure using a polygon mesh, and the polygon mesh is output from an automatic 3D geometry generation algorithm.

17. The method of claim 10, further comprising,
providing, in a user interface, candidate regions of a plurality of regions on which to apply the amount of complexity reduction of the first geometry representing the three-dimensional model of the object; and
receiving, in the user interface, a selection of one or more of the candidate regions on which to apply the amount of complexity reduction to produce the second geometry.

18. A system comprising:
a non-transitory storage medium having instructions of a shape modeling computer program stored thereon; and
one or more data processing apparatus configured to run the instructions of the shape modeling computer program to perform operations specified by the instructions of the shape modeling computer program;
wherein the operations comprise
receiving a selection of first geometry defined in a data structure used by the shape modeling computer program to represent a three-dimensional model of an object and an indication of an amount of complexity reduction, wherein the first geometry is defined in the data structure using a polygon mesh or the polygon mesh is generated from the first geometry;
producing second geometry defined in the data structure based on the indication of the amount of indicated complexity reduction and taking into account local shape curvature for the first geometry, wherein the second geometry replaces the first geometry in representing the three-dimensional model of the object, wherein the producing comprises:
skeletonizing the polygon mesh to produce a network of connected polylines;
generating medial sections from the polygon mesh and the connected polylines, each of the medial sections corresponding to a cross-section of the polygon mesh captured orthogonal to the network of connected polylines and comprising curvature information for the polygon mesh at the cross-section, wherein a number of the medial sections generated is based on the indication of the amount of desired complexity reduction; and
generating a control mesh for a smooth surface representation of the second geometry from the medial sections and the network of connected polylines representing the polygon mesh representing the first geometry; and
providing the three-dimensional model of the object, with the second geometry included in the three-dimensional model, for use in manufacturing a physical structure corresponding to the object using one or more computer-controlled manufacturing systems, or for use in displaying the object on a display screen.

19. The system of claim 18, wherein generating, for each polyline of the network of connected polylines, a medial section of the medial sections comprises:
constructing a plane through a point on the polyline with a normal tangent to the polyline;
capturing the cross-section of the polygon mesh at the point by intersecting the plane with the polygon mesh;
determining a minimum distance and a maximum distance between a perimeter of the cross-section and the point on the polyline;
generating, the medial section based on the minimum distance and the maximum distance between the cross-section and the point on the polyline.

20. The system of claim 19, wherein generating, the medial section based on the minimum distance and the maximum distance between the cross-section and the point on the polyline comprises:
determining an average distance between the perimeter of the cross-section and the point on the polyline; and
generating the medial section having a radius corresponding to the average distance.

21. The system of claim 19, further comprising determining the number of the medial sections generated based on the indication of the amount of desired complexity reduction comprising:
generating a first number of points corresponding to first locations of endpoints of polylines of the network of connected polylines;
generating a second number of points corresponding to second locations of intersections between at least two polylines of the network of connected polylines; and
generating a third number of points corresponding to third locations of midpoints along respective polylines of the network of connected polylines.

22. The system of claim 21, wherein generating the third number of points corresponding to third location of midpoints along respective polylines of the network of connected polylines comprises:
calculating, from the indicated amount of complexity reduction, an arc length; and
generating each point of the third number of points corresponding to lengths along polylines between points including the first number of points and the second number of points of at least the arc length.

23. The system of claim 22, wherein the operations further comprise:
receiving an updated indication of a complexity reduction amount;
calculating an updated arc length based on the updated indication of complexity reduction amount; and
adjusting at least one point of the third number of points in response to the updated arc length.

24. The system of claim 18, wherein the operations further comprise:
  presenting, in a user interface, the network of connected polylines and medial sections;
  indicating, in the user interface, regions of one or more medial sections distributed about the network of connected polylines wherein a number of medial sections can be adjusted to update a complexity of the control mesh for the smooth surface representation of the second geometry;
  receiving, through the user interface, a selection of at least one region of the regions of one or more medial sections to update the complexity of the control mesh.

25. The system of claim 18, wherein the first geometry is defined in the data structure using a polygon mesh, and the polygon mesh is output from an automatic 3D geometry generation algorithm.

26. The system of claim 18, wherein the operations further comprise:
  providing, in a user interface, candidate regions of a plurality of regions on which to apply the amount of complexity reduction of the first geometry representing the three-dimensional model of the object; and
  receiving, in the user interface, a selection of one or more of the candidate regions on which to apply the amount of complexity reduction to produce the second geometry.

27. A system comprising:
  a non-transitory storage medium having instructions of a shape modeling computer program stored thereon; and
  one or more data processing apparatus configured to run the instructions of the shape modeling computer program to perform operations specified by the instructions of the shape modeling computer program;
  wherein the operations comprise
    receiving a selection of first geometry defined in a data structure used by the shape modeling computer program to represent a three-dimensional model of an object and an indication of an amount of complexity reduction, wherein the first geometry is defined in the data structure using a polygon mesh or the polygon mesh is generated from the first geometry;
    producing second geometry defined in the data structure based on the indication of the amount of indicated complexity reduction and taking into account local shape curvature for the first geometry, wherein the second geometry replaces the first geometry in representing the three-dimensional model of the object, wherein the producing comprises:
      skeletonizing the polygon mesh to produce a network of connected polylines representing the first geometry;
      obtaining the indication of the amount of desired complexity reduction as one or more construction parameters for the second geometry, the one or more construction parameters comprising an arc length;
      generating a node network based on the network of connected polylines, the node network comprising (i) first nodes corresponding to intersections of the connected polylines and second nodes added by subdividing the connected polylines based on the arc length, and (ii) beams connecting the first and second nodes; and
      generating a control mesh for a smooth surface representation of the second geometry from spline curves produced for the beams; and
    providing the three-dimensional model of the object, with the second geometry included in the three-dimensional model, for use in manufacturing a physical structure corresponding to the object using one or more computer-controlled manufacturing systems, or for use in displaying the object on a display screen.

28. The system of claim 27, wherein the operations further comprise:
  adjusting a number of nodes of the first nodes and the second nodes, wherein the adjusting comprises
    determining a distance tolerance based on an average beam length for the beams connecting neighboring nodes of the first nodes and the second nodes of the node network; and
    removing at least one node of the number of nodes based on the distance tolerance.

29. The system of claim 27, wherein generating, for each beam of the beams of the node network, the control mesh from spline curves produced for the beams comprises:
  generating, for each end node of the first nodes and the second nodes of the beam, an end cross-section, wherein a shape of the end cross-section and a scaling factor for a cross-sectional area of the end cross-section are based on the one or more construction parameters; and
  constructing a centerline loft body from the spline curve and the end cross-section.

30. The system of claim 29, wherein the spline curves are B-spline curves, and wherein generating the control mesh from spline curves produced for the beams further comprises:
  converting the B-spline curves into T-spline curves;
  determining, based on the shape and the scaling factor of each of the end cross-sections, a respective radius for a pipe handle corresponding to the end cross-section;
  affixing, to each end cross-section, the pipe handle; and
  generating the control mesh from the T-spline curves and pipe handles.

31. The system of claim 27, wherein the operations further comprise:
  presenting, in a user interface, dynamic controls for adjusting the one or more construction parameters;
  receiving, through the user interface, an indication of an update to at least one of the one or more construction parameters;
  producing, an updated second geometry defined in the data structure based on the indication of the update to at least one of the one or more construction parameters; and
  presenting, in the user interface, the updated second geometry.

32. The system of claim 27, wherein generating the control mesh for the smooth surface representation of the second geometry from spline curves produced for the beams comprises:
  determining, based on the indication of the amount of desired complexity reduction as the one or more construction parameters for the second geometry, to generate the control mesh as a B-Spline surface construction or as a T-Spline surface construction.

33. The system of claim 27, wherein the first geometry is defined in the data structure using a polygon mesh, and the polygon mesh is output from an automatic 3D geometry generation algorithm.

34. The system of claim 27, wherein the operations further comprise:

providing, in a user interface, candidate regions of a plurality of regions on which to apply the amount of complexity reduction of the first geometry representing the three-dimensional model of the object; and receiving, in the user interface, a selection of one or more of the candidate regions on which to apply the amount of complexity reduction to produce the second geometry.

35. One or more non-transitory computer storage media encoded with computer program instructions that when executed by one or more computers cause the one or more computers to perform operations comprising:

receiving, by a shape modeling computer program, a selection of first geometry defined in a data structure used by the shape modeling computer program to represent a three-dimensional model of an object and an indication of an amount of complexity reduction, wherein the first geometry is defined in the data structure using a polygon mesh or the polygon mesh is generated from the first geometry;

producing, by the shape modeling computer program, second geometry defined in the data structure based on the indication of the amount of indicated complexity reduction and taking into account local shape curvature for the first geometry, wherein the second geometry replaces the first geometry in representing the three-dimensional model of the object, wherein the producing comprises:

skeletonizing the polygon mesh to produce a network of connected polylines;

generating medial sections from the polygon mesh and the connected polylines, each of the medial sections corresponding to a cross-section of the polygon mesh captured orthogonal to the network of connected polylines and comprising curvature information for the polygon mesh at the cross-section, wherein a number of the medial sections generated is based on the indication of the amount of desired complexity reduction; and generating a control mesh for a smooth surface representation of the second geometry from the medial sections and the network of connected polylines representing the polygon mesh representing the first geometry; and providing, by the shape modeling computer program, the three-dimensional model of the object, with the second geometry included in the three-dimensional model, for use in manufacturing a physical structure corresponding to the object using one or more computer-controlled manufacturing systems, or for use in displaying the object on a display screen.

36. The one or more computer storage media of claim 35, wherein generating a medial section of the medial sections comprises, for each polyline of the network of connected polylines:

constructing a plane through a point on the polyline with a normal tangent to the polyline;

capturing the cross-section of the polygon mesh at the point by intersecting the plane with the polygon mesh;

determining a minimum distance and a maximum distance between a perimeter of the cross-section and the point on the polyline;

generating, the medial section based on the minimum distance and the maximum distance between the cross-section and the point on the polyline.

37. The one or more computer storage media of claim 36, wherein generating, the medial section based on the minimum distance and the maximum distance between the cross-section and the point on the polyline comprises:

determining an average distance between the perimeter of the cross-section and the point on the polyline; and generating the medial section having a radius corresponding to the average distance.

38. The one or more computer storage media of claim 36, further comprising determining the number of the medial sections generated based on the indication of the amount of desired complexity reduction comprising:

generating a first number of points corresponding to first locations of endpoints of polylines of the network of connected polylines;

generating a second number of points corresponding to second locations of intersections between at least two polylines of the network of connected polylines; and generating a third number of points corresponding to third locations of midpoints along respective polylines of the network of connected polylines.

39. The one or more computer storage media of claim 38, wherein generating the third number of points corresponding to third location of midpoints along respective polylines of the network of connected polylines comprises:

calculating, from the indicated amount of complexity reduction, an arc length; and generating each point of the third number of points corresponding to lengths along polylines between points including the first number of points and the second number of points of at least the arc length.

40. The one or more computer storage media of claim 39, further comprising:

receiving an updated indication of a complexity reduction amount;

calculating an updated arc length based on the updated indication of complexity reduction amount; and adjusting at least one point of the third number of points in response to the updated arc length.

41. The one or more computer storage media of claim 35, further comprising:

presenting, in a user interface, the network of connected polylines and medial sections;

indicating, in the user interface, regions of one or more medial sections distributed about the network of connected polylines wherein a number of medial sections can be adjusted to update a complexity of the control mesh for the smooth surface representation of the second geometry;

receiving, through the user interface, a selection of at least one region of the regions of one or more medial sections to update the complexity of the control mesh.

42. The one or more computer storage media of claim 35, wherein the first geometry is defined in the data structure using a polygon mesh, and the polygon mesh is output from an automatic 3D geometry generation algorithm.

43. The one or more computer storage media of claim 35, further comprising, providing, in a user interface, candidate regions of a plurality of regions on which to apply the amount of complexity reduction of the first geometry representing the three-dimensional model of the object; and receiving, in the user interface, a selection of one or more of the candidate regions on which to apply the amount of complexity reduction to produce the second geometry.

44. One or more non-transitory computer storage media encoded with computer program instructions that when executed by one or more computers cause the one or more computers to perform operations comprising:

receiving, by a shape modeling computer program, a selection of first geometry defined in a data structure used by the shape modeling computer program to represent a three-dimensional model of an object and an indication of an amount of complexity reduction, wherein the first geometry is defined in the data structure using a polygon mesh or the polygon mesh is generated from the first geometry;

producing, by the shape modeling computer program, second geometry defined in the data structure based on the indication of the amount of indicated complexity reduction and taking into account local shape curvature for the first geometry, wherein the second geometry replaces the first geometry in representing the three-dimensional model of the object, wherein the producing comprises:

skeletonizing the polygon mesh to produce a network of connected polylines representing the first geometry;

obtaining the indication of the amount of desired complexity reduction as one or more construction parameters for the second geometry, the one or more construction parameters comprising an arc length;

generating a node network based on the network of connected polylines, the node network comprising (i) first nodes corresponding to intersections of the connected polylines and second nodes added by subdividing the connected polylines based on the arc length, and (ii) beams connecting the first and second nodes; and generating a control mesh for a smooth surface representation of the second geometry from spline curves produced for the beams; and providing, by the shape modeling computer program, the three-dimensional model of the object, with the second geometry included in the three-dimensional model, for use in manufacturing a physical structure corresponding to the object using one or more computer-controlled manufacturing systems, or for use in displaying the object on a display screen.

45. The one or more computer storage media of claim 44, further comprising adjusting a number of nodes of the first nodes and the second nodes, where the adjusting comprises:

determining a distance tolerance based on an average beam length for the beams connecting neighboring nodes of the first nodes and the second nodes of the node network; and removing at least one node of the number of nodes based on the distance tolerance.

46. The one or more computer storage media of claim 44, wherein generating the control mesh from spline curves produced for the beams comprises, for each beam of the beams of the node network:

generating, for each end node of the first nodes and the second nodes of the beam, an end cross-section, wherein a shape of the end cross-section and a scaling factor for a cross-sectional area of the end cross-section are based on the one or more construction parameters; and constructing a centerline loft body from the spline curve and the end cross-section.

47. The one or more computer storage media of claim 46, wherein the spline curves are B-spline curves, and wherein generating the control mesh from spline curves produced for the beams further comprises:

converting the B-spline curves into T-spline curves;

determining, based on the shape and the scaling factor of each of the end cross-sections, a respective radius for a pipe handle corresponding to the end cross-section;

affixing, to each end cross-section, the pipe handle; and generating the control mesh from the T-spline curves and pipe handles.

48. The one or more computer storage media of claim 44, further comprising:

presenting, in a user interface, dynamic controls for adjusting the one or more construction parameters;

receiving, through the user interface, an indication of an update to at least one of the one or more construction parameters;

producing, an updated second geometry defined in the data structure based on the indication of the update to at least one of the one or more construction parameters; and presenting, in the user interface, the updated second geometry.

49. The one or more computer storage media of claim 44, wherein generating the control mesh for the smooth surface representation of the second geometry from spline curves produced for the beams comprises:

determining, based on the indication of the amount of desired complexity reduction as the one or more construction parameters for the second geometry, to generate the control mesh as a B-Spline surface construction or as a T-Spline surface construction.

50. The one or more computer storage media of claim 44, wherein the first geometry is defined in the data structure using a polygon mesh, and the polygon mesh is output from an automatic 3D geometry generation algorithm.

51. The one or more computer storage media of claim 44, further comprising, providing, in a user interface, candidate regions of a plurality of regions on which to apply the amount of complexity reduction of the first geometry representing the three-dimensional model of the object; and receiving, in the user interface, a selection of one or more of the candidate regions on which to apply the amount of complexity reduction to produce the second geometry.

* * * * *